(12) United States Patent
Li et al.

(10) Patent No.: US 10,090,947 B2
(45) Date of Patent: Oct. 2, 2018

(54) RECEIVING DEVICE AND RECEIVED SIGNAL PROCESSING METHOD

(71) Applicant: Huawei Technologies Co., Ltd., Shenzhen (CN)

(72) Inventors: Xianfeng Li, Chengdu (CN); Yanzhao Pang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/708,607

(22) Filed: Sep. 19, 2017

(65) Prior Publication Data

US 2018/0006744 A1    Jan. 4, 2018

Related U.S. Application Data

(63) Continuation of application No. PCT/CN2015/074741, filed on Mar. 20, 2015.

(51) Int. Cl.
*H04B 17/336* (2015.01)
*H04L 1/20* (2006.01)
*H04B 1/10* (2006.01)

(52) U.S. Cl.
CPC ......... *H04B 17/336* (2015.01); *H04B 1/1027* (2013.01); *H04L 1/203* (2013.01)

(58) Field of Classification Search
CPC ...... H04B 17/336; H04B 1/1027; H04B 7/08; H04L 1/203; H04L 25/49; H04L 27/38; H04L 47/10; H04L 27/368; H03F 1/3241; H03F 1/3247; H03F 1/3294; H03F 2200/336; H03F 3/195; H03F 3/245

USPC ............................. 375/227; 330/149; 710/29
See application file for complete search history.

(56) References Cited

U.S. PATENT DOCUMENTS

| | | | |
|---|---|---|---|
| 8,867,599 B2* | 10/2014 | Smith | H04L 25/03006 375/224 |
| 8,947,538 B2* | 2/2015 | Davis | H04N 17/004 348/192 |
| 8,989,155 B2* | 3/2015 | Forenza | H04B 7/022 370/334 |

(Continued)

FOREIGN PATENT DOCUMENTS

| CN | 1937445 A | 3/2007 |
|---|---|---|
| CN | 101257338 A | 9/2008 |

(Continued)

*Primary Examiner* — Hirdepal Singh
(74) *Attorney, Agent, or Firm* — Slater Matsil, LLP

(57) ABSTRACT

A receiving device and signal processing method, the method including monitoring quality parameters of N received signals in real time, wherein the N received signals are obtained by N receive antennas from a same transmit antenna, predicting, according to the quality parameters, whether quality of a first combined signal that is obtained after combination processing is performed on the N received signals is superior to quality of a received signal whose quality is optimal in the N received signals, determining the first combined signal as a to-be-processed signal in response to predicting that the quality of the first combined signal is superior to the quality of the received signal, and determining a to-be-processed signal according to M received signals of the N received signals in response to predicting that the quality of the first combined signal is inferior to the quality of the received signal.

20 Claims, 13 Drawing Sheets

(56) References Cited

U.S. PATENT DOCUMENTS

| | | |
|---|---|---|
| 2005/0014469 A1 | 1/2005 | Sonoda |
| 2005/0164709 A1* | 7/2005 | Balasubramanian ... H04L 47/10 455/453 |
| 2008/0056217 A1* | 3/2008 | Hara ............... H04B 7/061 370/342 |
| 2008/0188183 A1* | 8/2008 | Dwyer ............. H04B 7/0871 455/67.7 |
| 2010/0009636 A1* | 1/2010 | Hasegawa ......... H04B 17/0042 455/67.11 |
| 2011/0026418 A1* | 2/2011 | Bollea ............. H01Q 1/2258 370/252 |
| 2011/0261872 A1* | 10/2011 | Wang .............. H04J 11/004 375/227 |
| 2013/0230094 A1 | 9/2013 | Eliezer et al. |
| 2016/0036508 A1* | 2/2016 | Szini .............. H04B 7/0814 375/227 |
| 2017/0019937 A1* | 1/2017 | Kim ............... H04W 8/26 |
| 2017/0201893 A1* | 7/2017 | Seol .............. H04W 16/28 |

FOREIGN PATENT DOCUMENTS

| | | |
|---|---|---|
| EP | 0883208 A2 | 12/1998 |
| WO | 03039033 A1 | 5/2003 |
| WO | 2007120409 A2 | 10/2007 |
| WO | 2012167622 A1 | 12/2012 |
| WO | 2013173809 A1 | 11/2013 |

\* cited by examiner

RECEIVING DEVICE AND RECEIVED SIGNAL PROCESSING METHOD

CROSS-REFERENCE TO RELATED APPLICATIONS

This application is a continuation of International Application No. PCT/CN2015/074741, filed on Mar. 20, 2015, the disclosure of which is hereby incorporated by reference in its entirety.

TECHNICAL FIELD

Embodiments of the present invention relate to the field of communications technologies, and in particular, to a receiving device and a received signal processing method.

BACKGROUND

FIG. 1 is a schematic diagram of a space diversity system in the prior art. As shown in FIG. 1, a sending device includes only one transmit antenna in an enabled state, and the other transmit antenna is silent. However, for multiple receive antennas (using two receive antennas as an example in the figure) installed on a receiving device, each of the receive antennas can receive a signal sent by a transmit antenna that works, as long as a preset distance is satisfied in space. That is, the receiving device can simultaneously receive multiple received signals. Specifically, a signal sent by the transmit antenna shown in FIG. 1 is received by the two receive antennas of the receiving device through a transmission path 1 and a transmission path 2 respectively. That is, the obtained two received signals are the same. However, because there is no correlation between the transmission path 1 and the transmission path 2, the receiving device may combine the two received signals according to a rule, so that a reception gain can be increased for the signal sent by the transmit antenna.

However, it is found when signal receiving is performed by using the foregoing existing technology that, the foregoing signals transmitted through the transmission path 1 and the transmission path 2 are subject to interference from a communication environment in a transmission process, and quality of one signal may deteriorate. Therefore, signal-to-noise ratios of the two received signal differ relatively much from each other. In this case, if the two received signals are still combined, a combined signal not only cannot increase the reception gain but also has degraded quality, affecting subsequent signal processing.

SUMMARY

Embodiments of the present invention provide a receiving device and a received signal processing method, to improve communication performance of a space diversity system.

According to a first aspect, an embodiment of the present invention provides a receiving device, including at least N receive antennas, a combination module, a demodulation module, and a monitoring and control module, where the N receive antennas are in communication connection to the combination module, the demodulation module, and the monitoring and control module, and the combination module is in communication connection to the monitoring and control module. The demodulation module is configured to: demodulate N received signals to obtain quality parameters of the N received signals, and send the quality parameters of the N received signals to the monitoring and control module, where the N received signals are obtained by the N receive antennas by receiving a signal sent by a same transmit antenna of a sending device. The monitoring and control module is configured to monitor the quality parameters of the N received signals in real time. The monitoring and control module is configured to: predict, according to the quality parameters of the N received signals, whether quality of a first combined signal that is output after the combination module performs combination processing on the N received signals is superior to quality of a received signal whose quality is optimal in the N received signals, and if the monitoring and control module predicts that the quality of the first combined signal is superior to the quality of the received signal whose quality is optimal in the N received signals, determine the first combined signal, which is output after the combination module performs combination processing on the N received signals, as a to-be-processed signal; or if the monitoring and control module predicts that the quality of the first combined signal is inferior to the quality of the received signal whose quality is optimal in the N received signals, determine a to-be-processed signal according to M received signals of the N received signals, where N is an integer not less than 2 and M is an integer greater than 0 and less than N.

According to a second aspect, an embodiment of the present invention provides a received signal processing method, including monitoring quality parameters of N received signals in real time, where the N received signals are obtained by N receive antennas by receiving a signal sent by a same transmit antenna of a sending device, predicting, according to the quality parameters of the N received signals, whether quality of a first combined signal that is obtained after combination processing is performed on the N received signals is superior to quality of a received signal whose quality is optimal in the N received signals, and if it is predicted that the quality of the first combined signal is superior to the quality of the received signal whose quality is optimal in the N received signals, determining the first combined signal as a to-be-processed signal; or if it is predicted that the quality of the first combined signal is inferior to the quality of the received signal whose quality is optimal in the N received signals, determining a to-be-processed signal according to M received signals of the N received signals, where N is an integer not less than 2 and M is an integer greater than 0 and less than N.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
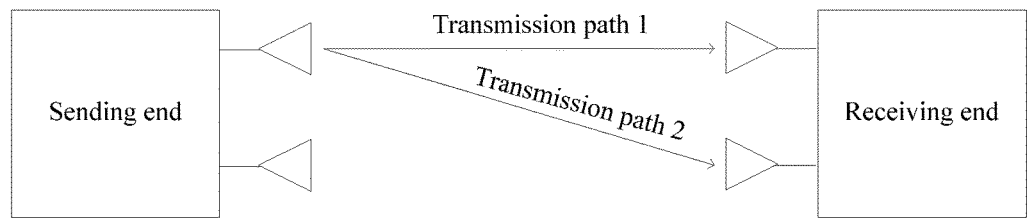
FIG. 1 is a schematic diagram of a space diversity system in the prior art.
Figure 2:
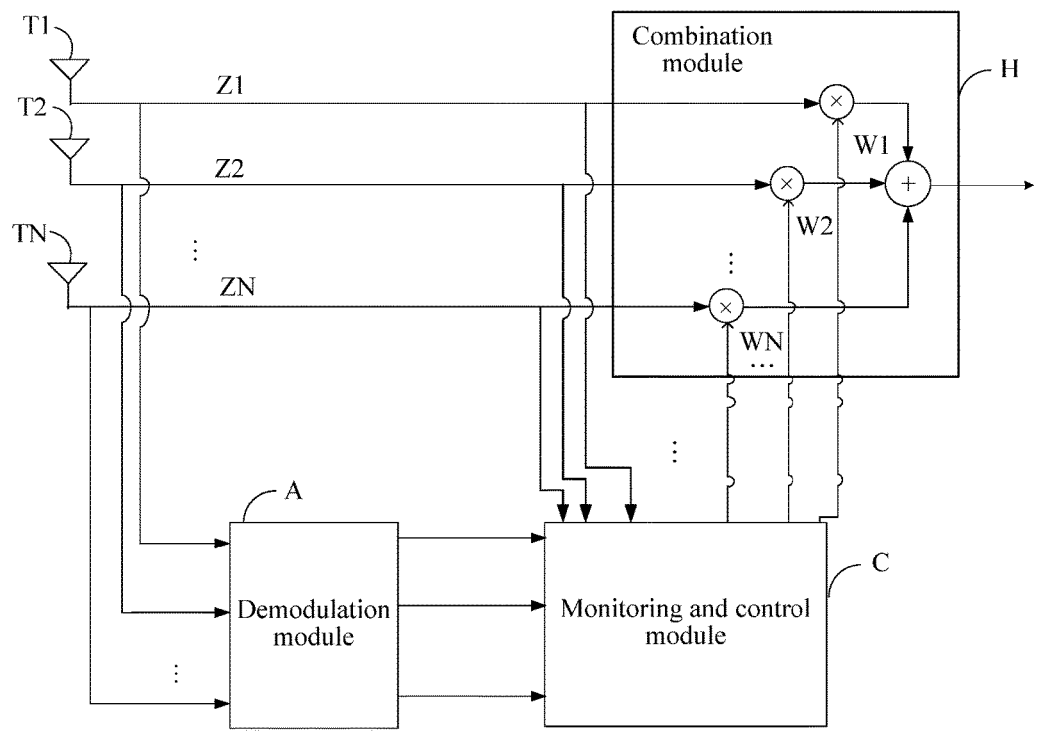
FIG. 2 is a schematic structural diagram of a receiving device according to Embodiment 1 of the present invention.

FIG. 2 is a schematic structural diagram of a receiving device according to Embodiment 1 of the present invention. As shown in FIG. 2, the receiving device is applicable to a space diversity system shown in FIG. 1. Specifically, the receiving device includes at least: N receive antennas (T1 to TN), a combination module H, a demodulation module A, and a monitoring and control module C. The N receive antennas T1 to TN are in communication connection to the combination module H, the demodulation module A, and the monitoring and control module C, and the combination module H is in communication connection to the monitoring and control module C.

The monitoring and control module C is configured to monitor quality parameters of N received signals in real time.

The demodulation module A is configured to: demodulate the N received signals to obtain the quality parameters of the N received signals, and send the quality parameters of the N received signals to the monitoring and control module C. The N received signals are obtained by the N receive antennas T1 to TN by receiving a signal sent by a same transmit antenna of a sending device.

The monitoring and control module C is configured to: predict, according to the quality parameters of the N received signals, whether quality of a first combined signal that is output after the combination module H performs combination processing on the N received signals is superior to quality of a received signal whose quality is optimal in the N received signals.

N is an integer not less than 2. It may be understood that, to improve communication reliability during communication between the sending device and the receiving device, the receiving device uses the N receive antennas to receive a same signal sent by a same transmit antenna of the sending device, to obtain N received signals. That is, the N received signals are generated by transmitting, through N different paths, a signal sent by one transmit antenna of the sending device. Subsequently, the receiving device performs combination processing on the N received signals, thereby increasing a reception gain.

However, because a communication environment varies, N received signals that are generated by transmitting a same signal through different paths have performance differences, resulting in performance deterioration of a combined signal obtained after combination. Consequently, subsequent signal processing is affected. Therefore, as the N receive antennas continuously receive the signal sent by the sending device, the monitoring and control module in the receiving device also needs to monitor quality parameters of the N received signals in real time, to learn whether performance of the combined signal obtained after combination processing deteriorates. The quality parameters are obtained by the demodulation module by demodulating the signals.

If the monitoring and control module C predicts that the quality of the first combined signal is superior to the quality of the received signal whose quality is optimal in the N received signals, the first combined signal that is output after the combination module H performs combination processing on the N received signals is determined as a to-be-processed signal.

If the monitoring and control module C predicts, according to the quality parameters of the N received signals, that the quality of the first combined signal that is obtained after the combination module H performs combination processing on the N received signals does not deteriorate, a reception gain of the first combined signal is higher than a reception gain of any one of the N received signals. Performing subsequent signal processing by using the first combined signal can effectively improve communication performance of the sending device and the receiving device. Therefore, the first combined signal is determined as the to-be-processed signal, so as to continue to perform subsequent signal processing.

If the monitoring and control module C predicts that the quality of the first combined signal is inferior to the quality of the received signal whose quality is optimal in the N received signals, a to-be-processed signal is determined according to M received signals of the N received signals, where M is an integer greater than 0 and less than N.

Specifically, if the monitoring and control module C determines, according to the quality parameters of the N received signals, that the quality of the first combined signal that is obtained after combination processing is performed on the N received signals deteriorates, a gain of the first combined signal is not effectively increased. In addition, if subsequent processing, such as decoding, continues to be performed by using the first combined signal, a bit error or other cases affecting the subsequent processing may be caused. Therefore, in this embodiment, signal processing no longer continues to be performed according to the first combined signal, but a to-be-processed signal is determined again. For example, one of the N received signals is determined as the to-be-processed signal, or some of the N received signals are combined to obtain a combined signal whose quality does not deteriorate and reception gain is relatively high.

It should be noted that receiving and sending of a signal are continuously performed. Therefore, when the N receive antennas continuously receive a signal, the demodulation module A and the monitoring and control module C work in real time at the same time. Therefore, each time it is predicted, according to the quality parameters of the N received signals, that the quality of the first combined signal that is obtained after combination processing is performed on the N received signals does not deteriorate, subsequent signal processing may continue to be performed according to the first combined signal. When it is predicted, according to the quality parameters of the N received signals, the quality of the first combined signal that is obtained after combination processing is performed on the N received signals deteriorates, signal processing no longer continues to be performed according to the first combined signal, thereby avoiding an adverse effect on a subsequent signal processing procedure. Compared with selectively receiving one of the N received signals regardless whether a combined signal deteriorates in the prior art, in this embodiment, it is flexibly determined, in combination with quality parameters of current N received signals, whether the first combined signal deteriorates at a current moment. Therefore, when the first combined signal does not deteriorate, the first combined signal is selected as the to-be-processed signal, so that a relatively high reception gain generated by a combined signal with relatively desirable quality is not wasted, and the receiving device and the space diversity system in which the receiving device is located may work in a high modulation mode, thereby increasing a communication distance, increasing a communication capacity, and increasing efficiency of the space diversity system. In addition, when the first combined signal deteriorates, the first combined signal is flexibly filtered out, and signal processing no longer continues to be performed according to the first combined signal, thereby avoiding an adverse effect on a signal receiving procedure. It may be understood that, at a next moment after the first combined signal is filtered out, if it is determined, by means of monitoring, that the quality of the first combined signal does not deteriorate at the next moment and a state of being not deteriorated is kept for preset duration, the first combined signal is selected again, thereby achieving a relatively high reception gain of the first combined signal in time.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 3:
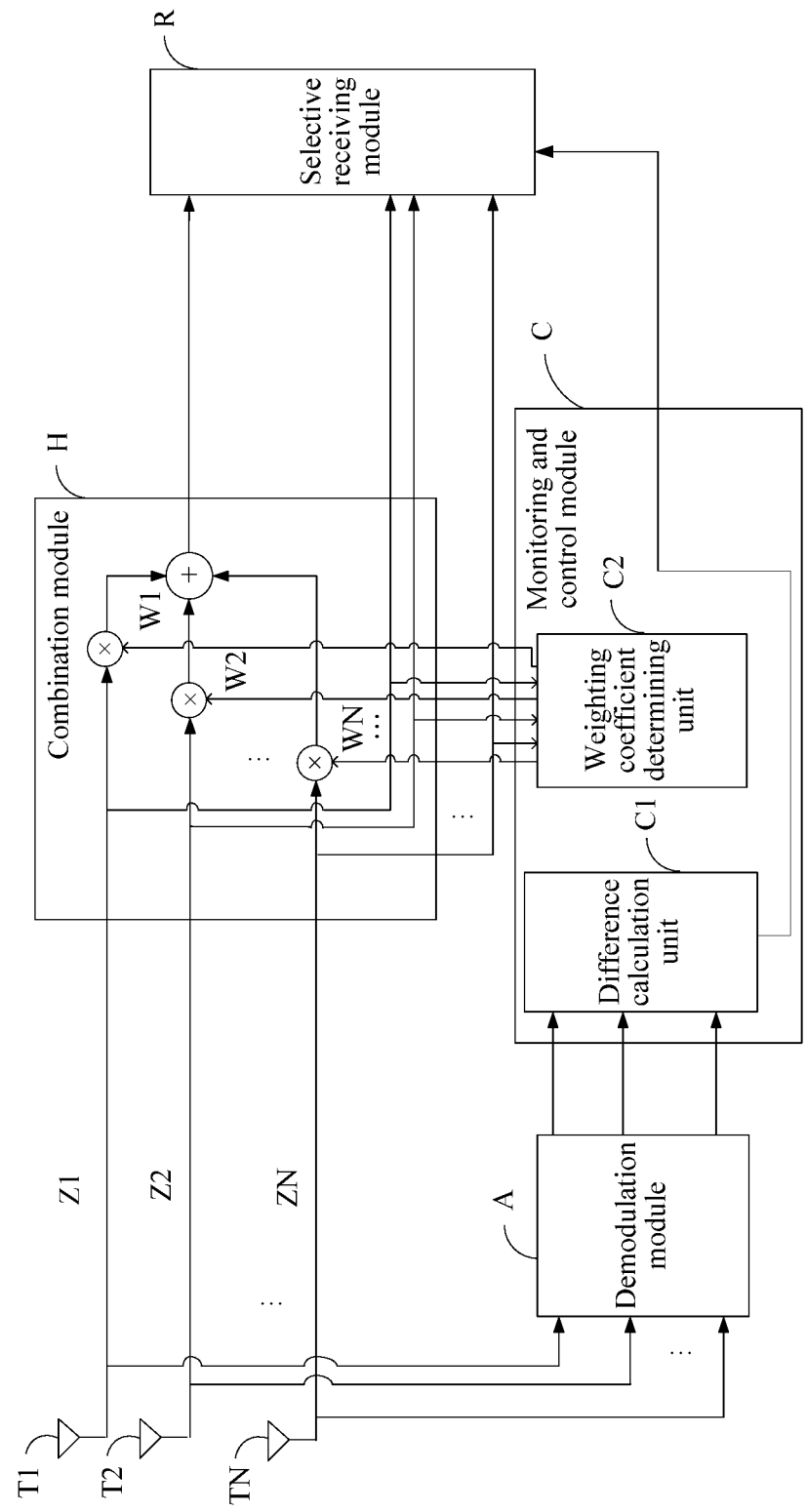
FIG. 3 is a first schematic structural diagram of a receiving device according to Embodiment 2 of the present invention.
Figure 4:
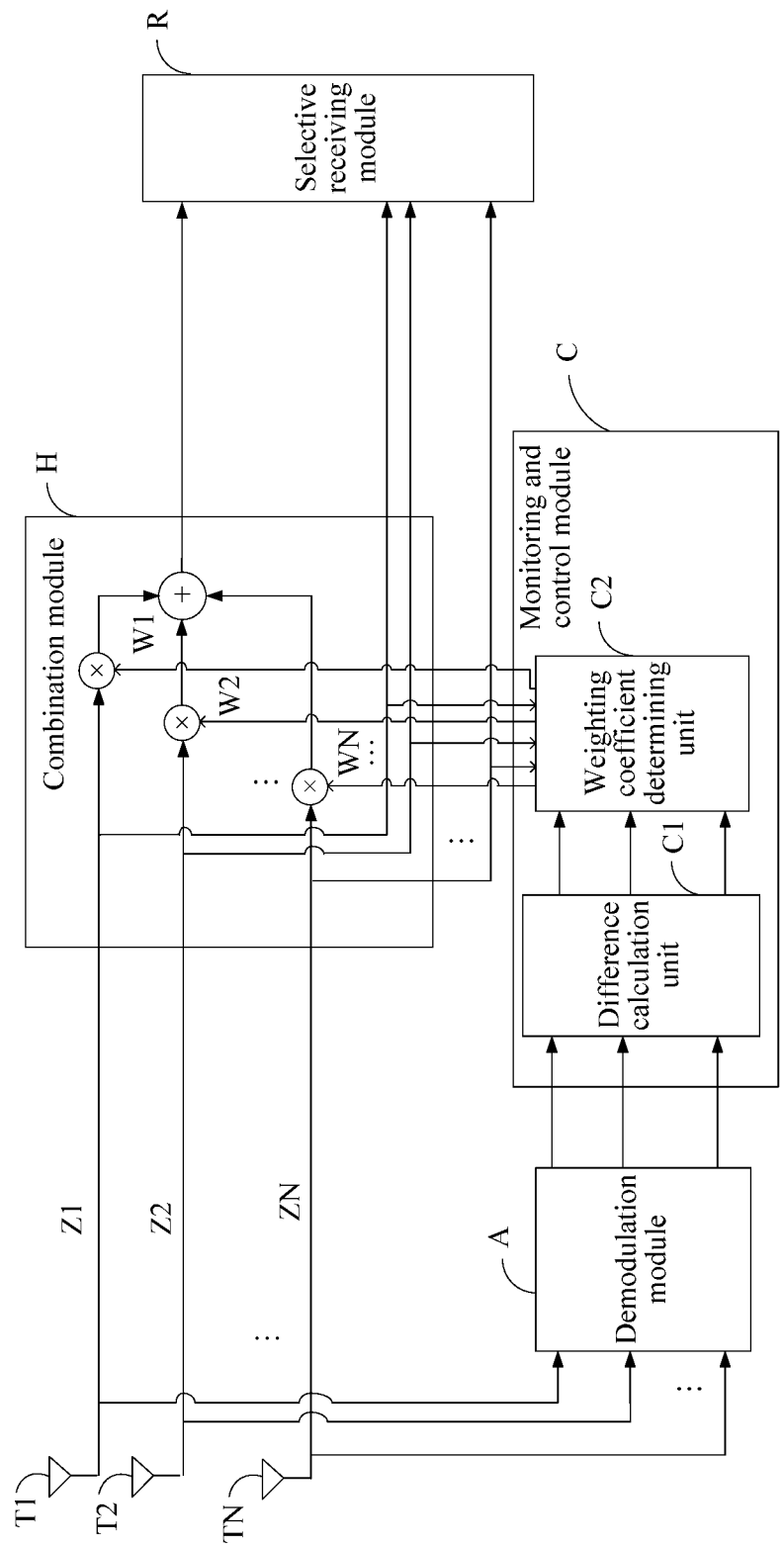
FIG. 4 is a second schematic structural diagram of the receiving device according to Embodiment 2 of the present invention.

FIG. 3 is a first schematic structural diagram of a receiving device according to Embodiment 2 of the present invention. FIG. 4 is a second schematic structural diagram of the receiving device according to Embodiment 2 of the present invention. As shown in FIG. 3 and FIG. 4, this embodiment is further described based on the embodiment shown in FIG. 2. Specifically, the device further includes a selective receiving module R. The selective receiving module R is in communication connection to the combination module H, and is further in communication connection to the N receive antennas T1 to TN.

The monitoring and control module C includes a difference calculation unit C1 and a weighting coefficient determining unit C2, and the weighting coefficient determining unit C2 is in communication connection to the combination module H.

When the selective receiving module R is in communication connection to the difference calculation unit C1, that the monitoring and control module C is configured to determine a to-be-processed signal according to M received signals of the N received signals includes the difference calculation unit C1 being configured to notify the selective receiving module R that the first combined signal that is output after the combination module H performs combination processing on the N received signals is not the to-be-processed signal, and trigger the selective receiving module R to determine, in the N received signals, one received signal that satisfies a preset condition as the to-be-processed signal, or when the difference calculation unit C1 is in communication connection to the weighting coefficient determining unit C2 and there is no communication connection between the selective receiving module R and the difference calculation unit C1, that the monitoring and control module C is configured to determine a to-be-processed signal according to M received signals of the N received signals includes the difference calculation unit C1 is configured to notify the weighting coefficient determining unit C2 of combination indication information, and the weighting coefficient determining unit C2 is configured to: control, according to the combination indication information, the combination module H to perform combination processing on all received signals that are in the N received signals and that do not cause the quality of the first combined signal to be inferior to the quality of the received signal whose quality is optimal in the N received signals, and output a second combined signal to the selective receiving module R.

The monitoring and control module C predicts, whether the first combined signal may be used as a to-be-processed signal, and the selective receiving module R may transfer, according to a prediction result of the monitoring and control module C, a to-be-processed signal (for example, one of the N received signals that is selected according to a notification of the monitoring and control module C or the second combined signal output by the combination module) determined by the monitoring and control module C to a subsequent processing module (not shown in the figure).

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 5:
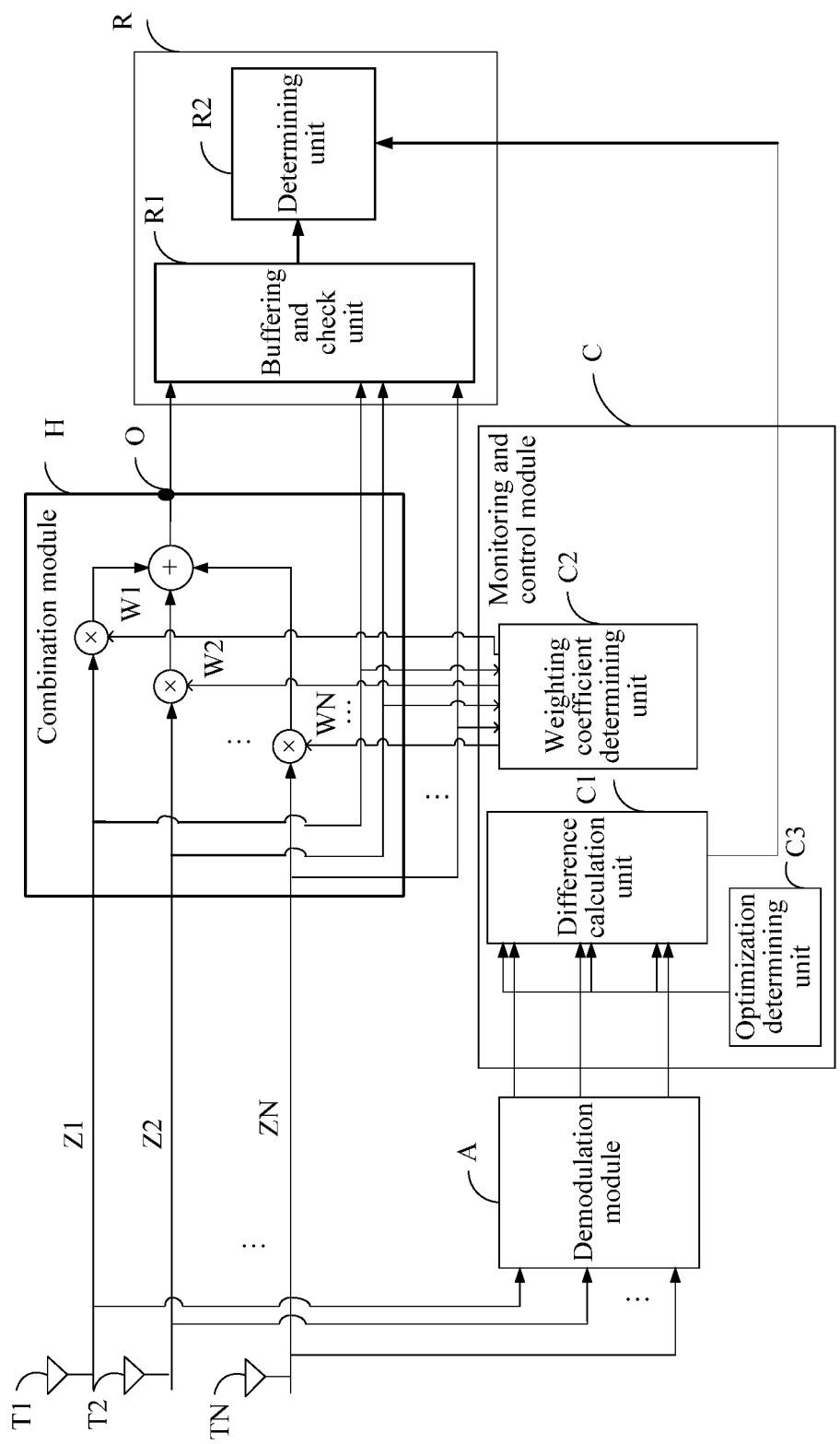
FIG. 5 is a schematic structural diagram of a receiving device according to Embodiment 3 of the present invention.

FIG. 5 is a schematic structural diagram of a receiving device according to Embodiment 3 of the present invention. As shown in FIG. 5, this embodiment is further described based on the schematic structural diagram shown in FIG. 3.

The selective receiving module R includes a buffering and check unit R1 and a determining unit R2, the buffering and check unit R1 is in communication connection to the determining unit R2, and the buffering and check unit R1 is in communication connection to the combination module H. Specifically, the buffering and check unit R1 is in communication connection to an output end O of the combination module H; and the buffering and check unit R1 is further in communication connection to the difference calculation unit C1.

Optionally, the monitoring and control module further includes an optimization determining unit C3, and the optimization determining unit C3 is in communication connection to the demodulation module A and the difference calculation unit C1.

The optimization determining unit C3 is configured to determine, according to the quality parameters of the N received signals obtained by the demodulation module A, the received signal whose quality is optimal in the N received signals.

The difference calculation unit C1 is configured to subtract a quality parameter of each of the N received signals from a quality parameter of the received signal whose quality is optimal, to obtain a difference that corresponds to each received signal.

The difference calculation unit C1 is further configured to update an enablement status of each received signal according to the difference that corresponds to each received signal.

Optionally, when the quality parameter is a signal-to-noise ratio, that the difference calculation unit C1 is configured to update an enablement status of each received signal includes, if the enablement status of the received signal is enabled and the difference that corresponds to the received signal is greater than an upper threshold, the difference calculation unit C1 is specifically configured to update the enablement status of the received signal to disabled, if the enablement status of the received signal is enabled and the difference that corresponds to the received signal is not greater than an upper threshold, the difference calculation unit C1 keeps the enablement status of the received signal enabled, if the enablement status of the received signal is disabled and the difference that corresponds to the received signal is less than a lower threshold, the difference calculation unit C1 updates the enablement status of the received signal to enabled, or if the enablement status of the received signal is disabled and the difference that corresponds to the received signal is not less than a lower threshold, the difference calculation unit C1 keeps the enablement status of the received signal disabled.

After updating the enablement status of each received signal, the difference calculation unit C1 is configured to determine whether the N received signals include a received signal whose enablement status is disabled, and if the N received signals comprise a received signal whose enablement status is disabled, the difference calculation unit C1 predicts that the quality of the first combined signal is inferior to the quality of the received signal whose quality is optimal in the N received signals; or if the N received signals do not comprise a received signal whose enablement status is disabled, the difference calculation unit C1 predicts that the quality of the first combined signal is superior to the quality of the received signal whose quality is optimal in the N received signals.

It should be noted that, the optimization determining unit C3 may be omitted. For example, when N is 2, the difference calculation unit C1 may directly perform subtraction on quality parameters of two received signals. If a difference between the quality parameters of the two received signals exceeds a preset value, it may be determined that quality of a first combined signal that is obtained after the two received signals are combined is inferior to quality of one of the two received signals.

Further, when the determining unit R2 is further in communication connection to the difference calculation unit C1, after the difference calculation unit C1 predicts that the quality of the first combined signal is superior to the quality of the received signal whose quality is optimal in the N received signals, the difference calculation unit C1 is further configured to notify the determining unit R2 that the first combined signal that is output after the combination module H performs combination processing on the N received signals is a to-be-processed signal.

Because a combined signal has a relatively high gain, the determining unit R2 in the selective receiving module R preferentially selects to receive the combined signal when quality of the combined signal does not deteriorate. However, due to an external temperature change or an external stress (for example, hailstones beat against a housing of the sending device or the receiving device), the N received signals include a received signal having a phase jump. If the received signal having a phase jump is involved in the combination processing, even if quality of the obtained combined does not deteriorate, a bit error occurs when information is obtained according to the combined signal, affecting receiving of the information. In addition, the received signal having a phase jump cannot be found by the monitoring and control module C. Therefore, the buffering and check unit R1 is provided in the selective receiving module R, so that after the monitoring and control module C determines the first combined signal as the to-be-processed signal, the buffering and check unit R1 further detects the first combined signal. For example, the buffering and check unit R1 may determine, by means of an Forward Error Correction (FEC) check, whether the first combined signal is in a bit-error-free state.

Specifically, the buffering and check unit R1 in the selective receiving module R is configured to: after the difference calculation unit C1 determines the first combined signal, which is output after the combination module H performs combination processing on the N received signals, as the to-be-processed signal, check the first combined signal output by the combination module H.

The determining unit R2 is configured to: determine the first combined signal as the to-be-processed signal when the buffering and check unit R1 determines that the first combined signal is in a bit-error-free state.

In addition, if the determining unit R2 determines that the first combined signal in a bit-error state, the determining unit R2 determines, in the N received signals, one received signal in a bit-error-free state as the to-be-processed signal when the buffering and check unit R1 determines that the received signal is in a bit-error-free state.

That is, in this embodiment, only a to-be-processed signal determined by the determining unit R2 is a final to-be-processed signal.

In addition, when the difference calculation unit C1 predicts that the quality of the first combined signal is inferior to the quality of the received signal whose quality is optimal in the N received signals, the difference calculation unit C1 is further configured to notify the determining unit R1 that the first combined signal that is output after the combination module H performs combination processing on the N received signals is not the to-be-processed signal; and when the selective receiving module R determines a to-be-processed signal, the buffering and check unit R1 is configured to check the received signals sent by the N receive antennas.

The determining unit R2 is configured to: determine, in the N received signals, one received signal in a bit-error-free state as the to-be-processed signal when the buffering and check unit R1 determines that the received signal is in a bit-error-free state.

In addition, the buffering and check unit R1 is further configured to: when the first combined signal is buffered, buffer the N received signals.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 6:
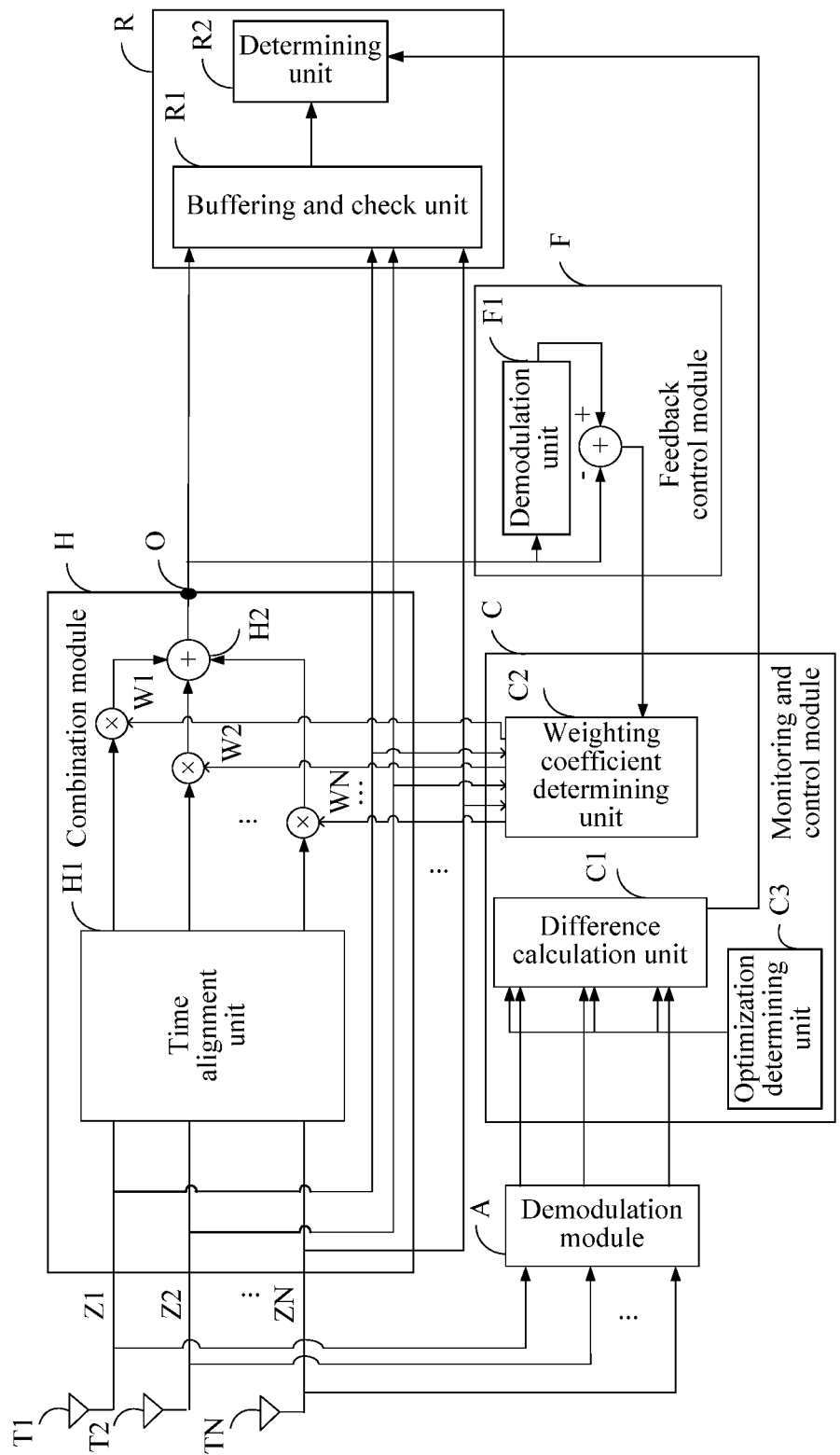
FIG. 6 is a schematic structural diagram of a receiving device according to Embodiment 5 of the present invention.

FIG. 6 is a schematic structural diagram of a receiving device according to Embodiment 5 of the present invention. As shown in FIG. 6, this embodiment is further described based on the embodiment shown in FIG. 5. Specifically, when the N receive antennas receive a signal sent by a same transmit antenna, the signal sent by the transmit antenna is transmitted through different transmission paths, so that received signals are received by the N receive antennas at different moments. Therefore, in this embodiment, the combination module H further includes a time alignment unit H1. Therefore, when the N received signals received by the N receive antennas are input into the demodulation module A, the N received signals received are further input into the time alignment unit H1 at the same time, so that the combining unit H2 performs combination processing on the N received signals after delays of the N received signals are kept consistent, and subsequently a combined signal is output to the selective receiving module R.

Because a communication environment varies in real time, values of weighting coefficients (W1 to WN) determined for N received signals (Z1 to ZN) received at a current moment may not be suitable for N received signals received at a next moment. Therefore, a feedback control mechanism is used in this embodiment. That is, when a first combined signal Q1 is input into the selective receiving module R, Q1 is further transmitted to the feedback control module F at the same time. The feedback control module F determines, according to Q1, a desired signal that corresponds to Q1, subsequently subtracts the desired signal from Q1 to obtain a degree of differentiation, and feeds back the degree of differentiation to the weighting coefficient determining unit C2, so that the weighting coefficient determining unit C2 adaptively adjusts the values of W1 to WN according to the degree of differentiation between the desired signal and Q1, and Z1 to ZN.

Figure 7:
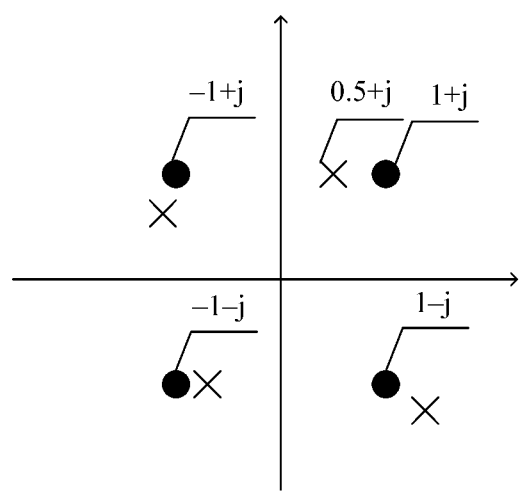
FIG. 7 is a schematic structural diagram of standard constellation points of the receiving device according to Embodiment 5 of the present invention.

It should be additionally noted that, FIG. 7 is a schematic structural diagram of standard constellation points of the receiving device according to Embodiment 5 of the present invention. As shown in FIG. 7, using four standard constellation points as a simple example, the four standard constellation points (represented by "●" in the figure) are located in a complex coordinate system, and are separately $(1+j)$, $(1-j)$, $(-1+j)$, and $(-1-j)$. When sending information, the sending device maps the information to the standard constellation points, or in other words, the sending device modulates the information onto the standard constellation points, to obtain a signal, and subsequently sends the signal to the receiving device by using a transmit antenna. The receiving device demodulates the received signal (herein, demodulation may be performed by a demodulation unit F1 in the feedback control module F). Assuming that the signal is subjected to no interference in a transmission process, the received signal received by the receiving device is completely consistent with the signal sent by the sending device. After demodulating the received signal, the receiving device sequentially obtains points that coincide with the standard constellation points. However, due to transmission interference, there is an error between the received signal of the receiving device and the signal sent by the sending device, so that there is a deviation between points (which are represented by "×" in the figure) obtained through demodulation and the standard constellation points. For example, the feedback control module F demodulates Q1 to obtain a point $(0.5+j)$, and the point $(0.5+j)$ is closest to the standard constellation points $(1+j)$. Therefore, when Q1 is represented by using the point $(0.5+j)$, the standard constellation points $(1+j)$ is determined as the desired signal in respect to the point $(0.5+j)$, and the degree of differentiation between Q1 and the desired signal may be represented by a distance between the point $(0.5+j)$ and the standard constellation points $(1+j)$.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 8:
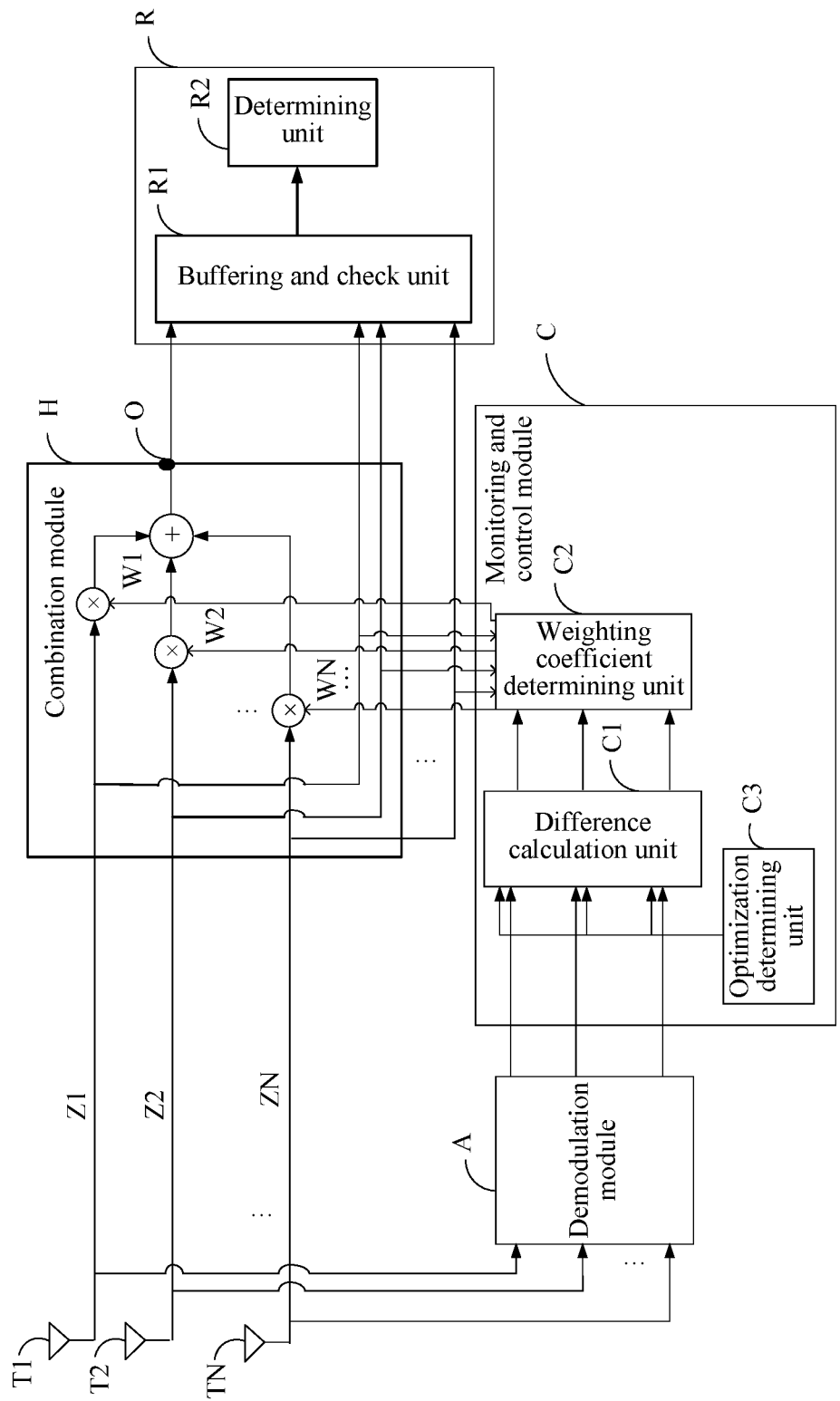
FIG. 8 is a schematic structural diagram of a receiving device according to Embodiment 6 of the present invention.

FIG. 8 is a schematic structural diagram of a receiving device according to Embodiment 6 of the present invention. As shown in FIG. 8, this embodiment is further described based on the schematic structural diagram shown in FIG. 4. Specifically, the selective receiving module R includes a buffering and check unit R1 and a determining unit R2, the buffering and check unit R1 is in communication connection to the determining unit R2, and the buffering and check unit R1 is in communication connection to the combination module H. Specifically, the buffering and check unit R1 is in communication connection to an output end O of the combination module H.

Optionally, the monitoring and control module further includes an optimization determining unit C3, and the optimization determining unit is in communication connection to the demodulation module A and the difference calculation unit C1.

The optimization determining unit C3 is configured to determine, according to the quality parameters of the N received signals obtained by the demodulation module, the received signal whose quality is optimal in the N received signals.

The difference calculation unit C1 is configured to subtract a quality parameter of each of the N received signals from a quality parameter of the received signal whose quality is optimal, to obtain a difference that corresponds to each received signal.

The difference calculation unit C1 is further configured to update an enablement status of each received signal according to the difference that corresponds to each received signal.

Optionally, when the quality parameter is a signal-to-noise ratio, that the difference calculation unit C1 is configured to update an enablement status of each received signal includes, if the enablement status of the received signal is enabled and the difference that corresponds to the received signal is greater than an upper threshold, the difference calculation unit C1 is specifically configured to update the enablement status of the received signal to disabled, if the enablement status of the received signal is enabled and the difference that corresponds to the received signal is not greater than an upper threshold, the difference calculation unit C1 keeps the enablement status of the received signal enabled if the enablement status of the received signal is disabled and the difference that corresponds to the received signal is less than a lower threshold, the difference calculation unit C1 updates the enablement status of the received signal to enabled, or if the enablement status of the received signal is disabled and the difference that corresponds to the received signal is not less than a lower threshold, the difference calculation unit C1 keeps the enablement status of the received signal disabled.

After updating the enablement status of each received signal, the difference calculation unit C1 is configured to determine whether the N received signals include a received signal whose enablement status is disabled, and if the N received signals comprise a received signal whose enablement status is disabled, the difference calculation unit C1 predicts that the quality of the first combined signal is inferior to the quality of the received signal whose quality is optimal in the N received signals, or if the N received signals do not comprise a received signal whose enablement status is disabled, the difference calculation unit C1 predicts that the quality of the first combined signal is superior to the quality of the received signal whose quality is optimal in the N received signals.

Further, after the difference calculation unit C1 predicts that the quality of the first combined signal is superior to the quality of the received signal whose quality is optimal in the N received signals, the difference calculation unit C1 is configured to notify the weighting coefficient determining unit C2 of combination indication information, and the combination indication information may indicate the enablement statuses of the N received signals. Specifically, the weighting coefficient determining unit C2 determines weighting coefficients for received signals whose enablement statuses are enabled, so that the combination module H performs combination processing on the received signals whose enablement statuses are enabled. That the difference calculation unit C1 determines that the quality of the first combined signal is superior to the quality of the received signal whose quality is optimal in the N received signals is equivalent to that enablement statuses of the N received signals are all enabled. Therefore, the combination indication information may indicate that the enablement statuses of the N received signals are enabled, so that the weighting coefficient determining unit C2 determines weighting coefficients for the N received signals and feeds back the determined weighting coefficients of the N received signals to the combination module H. A combined signal that is input by the combination module H by using the output end O of the combination module H into the buffering and check unit R1 is the first combined signal obtained by combing the N received signals.

Because a combined signal has a relatively high gain, the determining unit R2 in the selective receiving module R preferentially selects to receive the combined signal when quality of the combined signal does not deteriorate. However, due to an external temperature change or an external stress (for example, hailstones beat against a housing of the sending device or the receiving device), the N received signals include a received signal having a phase jump. If the received signal having a phase jump is involved in the combination processing, even if quality of the obtained combined does not deteriorate, a bit error occurs when information is obtained according to the combined signal, affecting receiving of the information. In addition, the received signal having a phase jump cannot be found by the monitoring and control module C. Therefore, the buffering and check unit R1 is provided in the selective receiving module R, so that after the monitoring and control module C determines the first combined signal as the to-be-processed signal, the buffering and check unit R1 further needs to detect the first combined signal. For example, the buffering and check unit R1 may determine, by means of an Forward Error Correction (FEC) check, whether the first combined signal is in a bit-error-free state.

Specifically, the buffering and check unit R1 in the selective receiving module R is configured to check the first combined signal output by the combination module H.

The determining unit R2 is configured to: determine the first combined signal as the to-be-processed signal when the buffering and check unit R1 determines that the first combined signal is in a bit-error-free state.

In addition, if the buffering and check unit R1 determines that the first combined signal in a bit-error state, the determining unit R2 determines, in the N received signals, one received signal in a bit-error-free state as the to-be-processed signal when the buffering and check unit R1 determines that the received signal is in a bit-error-free state.

That is, in this embodiment, only a to-be-processed signal determined by the determining unit R2 is a final to-be-processed signal.

In addition, when the difference calculation unit C1 predicts that the quality of the first combined signal is inferior to the quality of the received signal whose quality is optimal in the N received signals, the difference calculation unit C1 is configured to notify the weighting coefficient determining unit C2 of combination indication information, and the combination indication information may indicate the enablement statuses of the N received signals. The weighting coefficient determining unit is configured to: control, according to the combination indication information, the combination module to perform combination processing on all received signals that are in the N received signals and that do not cause the quality of the first combined signal to be inferior to the quality of the received signal whose quality is optimal in the N received signals, and output a second combined signal to the selective receiving module. Specifically, the weighting coefficient determining unit C2 has known, according to the combination indication information, N-M received signals whose enablement statuses are disabled, so that the weighting coefficient determining unit C2 is specifically configured to: set weighting coefficients of the N-M received signals whose enablement statuses are disabled in the N received signals to 0, determine weighting coefficients for the M received signals whose enablement statuses are enabled, and feed back the determined weighting coefficients of the M received signals to the combination module H. The combination module performs combination processing on the M received signals whose enablement statuses are enabled and outputs the second combined signal.

When the second combined signal is output by the combination module H, similar to the first combined signal, considering that the received signals that are combined to form the second combined signal include a received signal having a phase jump, the buffering and check unit R1 in the selective receiving module R is configured to check the second combined signal output by the combination module H.

The determining unit R2 is configured to: determine the second combined signal as the to-be-processed signal when the buffering and check unit R1 determines that the second combined signal is in a bit-error-free state.

In addition, if the buffering and check unit R1 determines that the second combined signal in a bit-error state, the determining unit R2 determines, in the N received signals, one received signal in a bit-error-free state as the to-be-processed signal when the buffering and check unit R1 determines that the received signal is in a bit-error-free state.

That is, in this embodiment, only a to-be-processed signal determined by the determining unit R2 is a final to-be-processed signal.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 9:
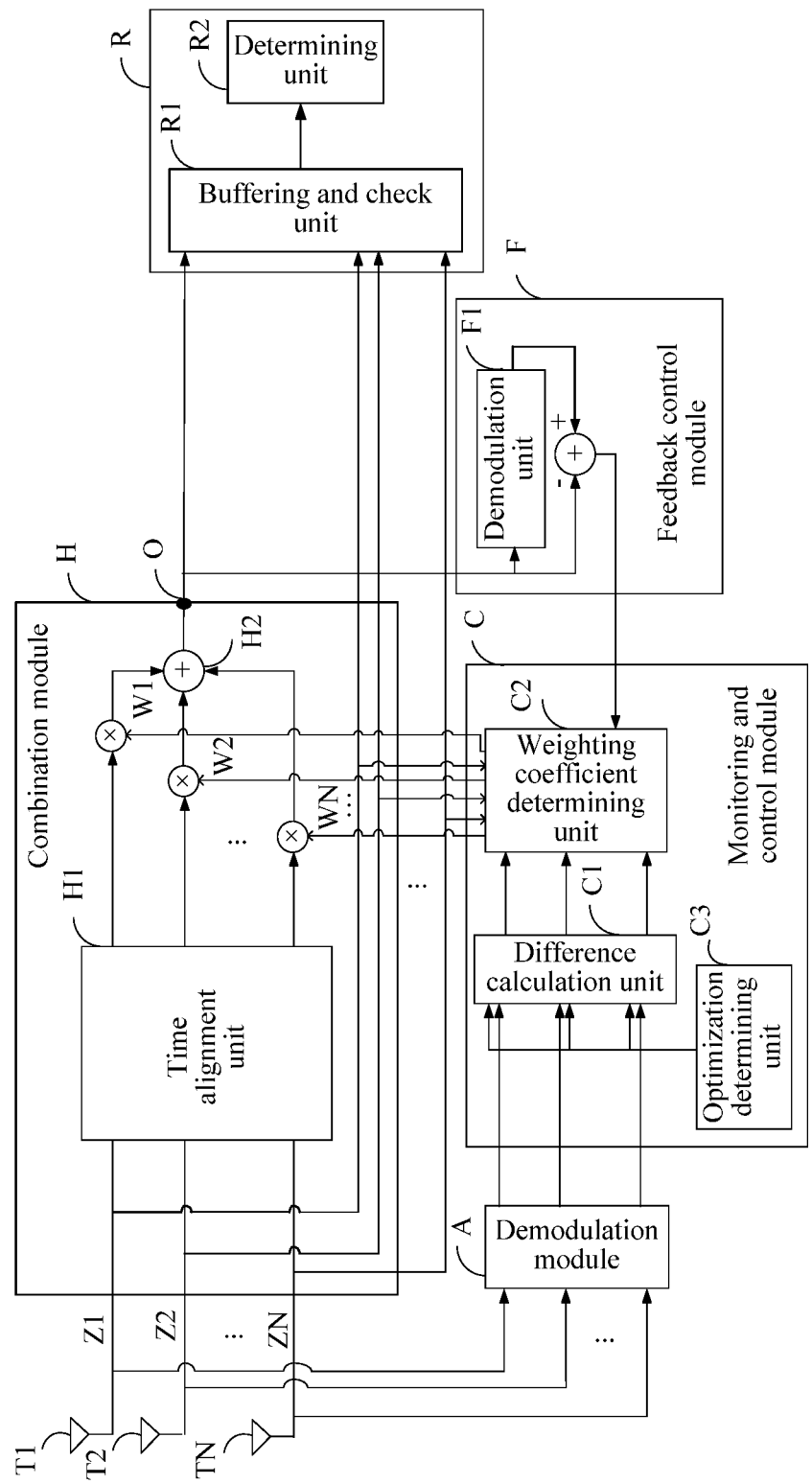
FIG. 9 is a schematic structural diagram of a receiving device according to Embodiment 7 of the present invention.

FIG. 9 is a schematic structural diagram of a receiving device according to Embodiment 7 of the present invention. As shown in FIG. 9, this embodiment is further described based on the embodiment shown in FIG. 8. Specifically, when the N receive antennas receive a signal sent by a same transmit antenna, the signal sent by the transmit antenna is transmitted through different transmission paths, so that received signals are received by the N receive antennas at different moments. Therefore, in this embodiment, the combination module H further includes a time alignment unit H1. Therefore, when the N received signals received by the N receive antennas are input into the demodulation module A, the N received signals received are further input into the time alignment unit H1 at the same time, so that the combining unit H2 performs combination processing on the N received signals after delays of the N received signals are kept consistent, and subsequently a combined signal is output to the selective receiving module R.

Because a communication environment varies in real time, values of weighting coefficients determined for N received signals or N-M received signals to be processed at a current moment may not be suitable for N received signals or N-M received signals received at a next moment. Therefore, a feedback control mechanism is used in this embodiment. If a combined signal output from the combining unit H2 is a first combined signal Q1, when Q1 is input into the selective receiving module R, Q1 is further transmitted to the feedback control module F at the same time. The feedback control module F determines, according to Q1, a desired signal that corresponds to Q1, subsequently subtracts the desired signal of Q1 from Q1 to obtain a degree of differentiation, and feeds back the degree of differentiation to the weighting coefficient determining unit C2, so that the weighting coefficient determining unit C2 adaptively adjusts values of W1 to WN according to the degree of differentiation between the desired signal and Q1, and the N received signals. If a combined signal output from the combining unit H2 is a second combined signal Q2, when Q2 is input into the selective receiving module R, Q2 is further transmitted to the feedback control module F at the same time. The feedback control module F determines, according to Q2, a desired signal that corresponds to Q2, subsequently subtracts the desired signal of Q2 from Q2 to obtain a degree of differentiation, and feeds back the degree of differentiation to the weighting coefficient determining unit C2, so that the weighting coefficient determining unit C2 adaptively adjusts values of W1 to WN according to the degree of differentiation between the desired signal and Q2, and the N-M received signals. For a specific feedback control process, refer to the descriptions provided for FIG. 7.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

It should be additionally noted that, in the embodiments shown in FIG. 2 to FIG. 9, division of the modules and units in the receiving device is merely logical function division, and during implementation, the modules and units may be circuit structures that implement corresponding functions. Optionally, there may be other division in actual implementation. For example, multiple modules or units may be combined, for example, multiple modules or units may be integrated into one application-specific integrated circuit (ASIC) chip, specifically, such as a field programmable gate array (FPGA) chip, a complex programmable logical device (CPLD) chip, or a digital signal processing (DSP) chip. Further, optionally, each of the modules or units may exist alone physically, and may be further divided into multiple modules or units, or some features may be ignored or not performed. In addition, communication connections between the modules and units may be specifically implemented by using some interfaces or by means of indirect couplings or direct couplings. The communication connections may be implemented in electronic, mechanical, or other forms.

Figure 10:
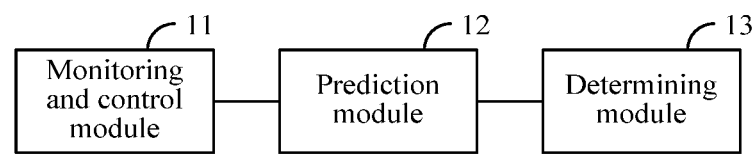
FIG. 10 is a schematic structural diagram of a receiving device according to Embodiment 8 of the present invention.

FIG. 10 is a schematic structural diagram of a receiving device according to Embodiment 8 of the present invention. As shown in FIG. 10, the receiving device in this embodiment includes a monitoring and control module 11, configured to monitor quality parameters of N received signals in real time, where the N received signals are obtained by N receive antennas by receiving a signal sent by a same transmit antenna of a sending device, a prediction module 12, configured to predict, according to the quality parameters of the N received signals, whether quality of a first combined signal that is obtained after combination processing is performed on the N received signals is superior to quality of a received signal whose quality is optimal in the N received signals, and a determining module 13, configured to: if it is predicted that the quality of the first combined signal is superior to the quality of the received signal whose quality is optimal in the N received signals, determine the first combined signal as a to-be-processed signal; or if it is predicted that the quality of the first combined signal is inferior to the quality of the received signal whose quality is optimal in the N received signals, determine a to-be-processed signal according to M received signals of the N received signals, where N is an integer not less than 2 and M is an integer greater than 0 and less than N.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 11:
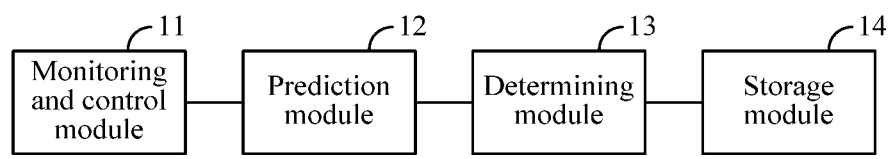
FIG. 11 is a schematic structural diagram of a receiving device according to Embodiment 9 of the present invention.

FIG. 11 is a schematic structural diagram of a receiving device according to Embodiment 9 of the present invention. As shown in FIG. 11, this embodiment is further described based on the embodiment shown in FIG. 10, and details are as follows.

When the determining module 13 is configured to determine the to-be-processed signal according to the M received signals of the N received signals, the determining module 13 is specifically configured to: determine, in the N received signals, one received signal that satisfies a preset condition as the to-be-processed signal, or specifically configured to: perform combination processing on all received signals that are in the N received signals and that do not cause the quality of the first combined signal to be inferior to the quality of the signal whose quality is optimal in the N received signals, to obtain a second combined signal, and determine the second combined signal as the to-be-processed signal.

Preferably, before the determining module 13 is configured to determine the first combined signal as the to-be-processed signal, the determining module 13 is further configured to determine that the first combined signal is in a bit-error-free state.

Preferably, before the determining module 13 is configured to determine the second combined signal as the to-be-processed signal, the determining module 13 is further configured to determine that the second combined signal is in a bit-error-free state.

In addition, if the determining module 13 determines that the first combined signal is in a bit-error state or determines that the second combined signal is in a bit-error state, the determining module 13 is further configured to determine, in the N received signals, any received signal in a bit-error-free state as the to-be-processed signal.

Further, when determining, in the N received signals, one received signal that satisfies a preset condition as the to-be-processed signal, the determining module 13 is specifically configured to determine, in the N received signals, one received signal in a bit-error-free state as the to-be-processed signal.

Further, when monitoring the quality parameters of the N received signals in real time, the monitoring and control module 11 is specifically configured to: determine, according to the quality parameters of the N received signals, the received signal whose quality is optimal in the N received signals; subtract a quality parameter of each of the N received signals from a quality parameter of the received signal whose quality is optimal, to obtain a difference that corresponds to each received signal; and update an enablement status of each received signal according to the difference that corresponds to each received signal.

When the quality parameter is a signal-to-noise ratio and the monitoring and control module updates the enablement status, the monitoring and control module is specifically configured to: if the enablement status of the received signal is enabled and the difference that corresponds to the received signal is greater than an upper threshold, update the enablement status of the received signal to disabled; if the enablement status of the received signal is enabled and the difference that corresponds to the received signal is not greater than an upper threshold, keep the enablement status of the received signal enabled; if the enablement status of the received signal is disabled and the difference that corresponds to the received signal is less than a lower threshold, update the enablement status of the received signal to enabled; or if the enablement status of the received signal is disabled and the difference that corresponds to the received signal is not less than a lower threshold, keep the enablement status of the received signal disabled.

Further, when the prediction module 12 predicts, according to the quality parameters of the N received signals, whether the quality of the first combined signal that is obtained after combination processing is performed on the N received signals is superior to the quality of the received signal whose quality is optimal in the N received signals, the prediction module 12 is specifically configured to: determine whether the N received signals include a received signal whose enablement status is disabled, and if yes, predict that the quality of the first combined signal is inferior to the quality of the received signal whose quality is optimal in the N received signals; or if not, predict that the quality of the first combined signal is superior to the quality of the received signal whose quality is optimal in the N received signals.

Further, when the determining module 13 performs combination processing on all the received signals that are in the N received signals and that do not cause the quality of the first combined signal to be inferior to the quality of the signal whose quality is optimal in the N received signals, to obtain the second combined signal, the determining module 13 is specifically configured to: filter out N-M received signals whose enablement statuses are disabled from the N received signals, and perform combination processing on the M received signals whose enablement statuses are enabled, to obtain the second combined signal.

In addition, optionally, the receiving device further includes a storage module 14, configured to: when the determine module 13 obtains the first combined signal or the second combined signal, keep the N received signals.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

It should be additionally noted that, in the receiving devices shown in FIG. 10 to FIG. 11, division of the modules is merely logical function division and may be other division in actual implementation. For example, multiple units may be combined or further divided into another multiple modules or units, or some features may be ignored or not performed. In addition, communication connections exist between the modules, and may be specifically implemented by using some interfaces or by means of indirect couplings or direct couplings. The communication connections may be implemented in electronic, mechanical, or other forms.

In addition, each of the modules in the embodiments of the network devices may be integrated into one function module or may exist alone physically, and the modules may be implemented in a form of hardware and/or hardware.

Figure 12:
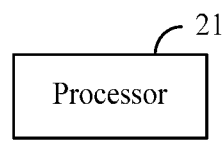
FIG. 12 is a schematic structural diagram of a receiving device according to Embodiment 10 of the present invention.

FIG. 12 is a schematic structural diagram of a receiving device according to Embodiment 10 of the present invention. As shown in FIG. 12, in this embodiment, the receiving device includes a processor 21, and the processor 21 may be an ASIC chip, specifically such as an FPGA chip, a CPLD chip, or a DSP chip.

The processor 21 is configured to monitor quality parameters of N received signals in real time, where the N received signals are obtained by N receive antennas by receiving a signal sent by a same transmit antenna of a sending device, predict, according to the quality parameters of the N received signals, whether quality of a first combined signal that is obtained after combination processing is performed on the N received signals is superior to quality of a received signal whose quality is optimal in the N received signals, and if it is predicted that the quality of the first combined signal is superior to the quality of the received signal whose quality is optimal in the N received signals, determine the first combined signal as a to-be-processed signal; or if it is predicted that the quality of the first combined signal is inferior to the quality of the received signal whose quality is optimal in the N received signals, determine a to-be-processed signal according to M received signals of the N received signals, where N is an integer not less than 2 and M is an integer greater than 0 and less than N.

Further, when the processor 21 is configured to determine the to-be-processed signal according to the M received signals of the N received signals, the processor 21 is configured to determine, in the N received signals, one received signal that satisfies a preset condition as the to-be-processed signal; or perform combination processing on all received signals that are in the N received signals and that do not cause the quality of the first combined signal to be inferior to the quality of the signal whose quality is optimal in the N received signals, to obtain a second combined signal; and determine the second combined signal as the to-be-processed signal.

Further, before the processor 21 is configured to determine the first combined signal as the to-be-processed signal, the processor 21 is further configured to determine that the first combined signal is in a bit-error-free state.

Further, before the processor 21 is configured to determine the second combined signal as the to-be-processed signal, the processor 21 is further configured to determine that the second combined signal is in a bit-error-free state.

It should be additionally noted that, if the processor 21 determines that the first combined signal is in a bit-error state or determines that the second combined signal is in a bit-error state, the processor 21 is further configured to determine, in the N received signals, any received signal in a bit-error-free state as the to-be-processed signal.

Further, when the processor 21 is configured to determine, in the N received signals, one received signal that satisfies a preset condition as the to-be-processed signal, the processor 21 is specifically configured to determine, in the N received signals, one received signal in a bit-error-free state as the to-be-processed signal.

More specifically, when the processor 21 is configured to monitor the quality parameters of the N received signals in real time, the processor 21 is specifically configured to: determine, according to the quality parameters of the N received signals, the received signal whose quality is optimal in the N received signals; subtract a quality parameter of each of the N received signals from a quality parameter of the received signal whose quality is optimal, to obtain a difference that corresponds to each received signal; and update an enablement status of each received signal according to the difference that corresponds to each received signal.

Optionally, when the quality parameter is a signal-to-noise ratio and the processor 21 is configured to update the enablement status, the processor 21 is specifically configured to: if the enablement status of the received signal is enabled and the difference that corresponds to the received signal is greater than an upper threshold, update the enablement status of the received signal to disabled, if the enablement status of the received signal is enabled and the difference that corresponds to the received signal is not greater than an upper threshold, keep the enablement status of the received signal enabled, if the enablement status of the received signal is disabled and the difference that corresponds to the received signal is less than a lower threshold, update the enablement status of the received signal to enabled, or if the enablement status of the received signal is disabled and the difference that corresponds to the received signal is not less than a lower threshold, keep the enablement status of the received signal disabled.

Further, when the processor 21 is configured to predict, according to the quality parameters of the N received signals, whether the quality of the first combined signal that is obtained after combination processing is performed on the N received signals is superior to the quality of the received signal whose quality is optimal in the N received signals, the processor 21 is specifically configured to: determine whether the N received signals include a received signal whose enablement status is disabled, and if yes, predict that the quality of the first combined signal is inferior to the quality of the received signal whose quality is optimal in the N received signals; or if not, predict that the quality of the first combined signal is superior to the quality of the received signal whose quality is optimal in the N received signals.

Further, when the processor 21 is configured to perform combination processing on all the received signals that are in the N received signals and that do not cause the quality of the first combined signal to be inferior to the quality of the signal whose quality is optimal in the N received signals, to obtain the second combined signal, the processor 21 is specifically configured to: filter out N-M received signals whose enablement statuses are disabled from the N received signals, and perform combination processing on the M received signals whose enablement statuses are enabled, to obtain the second combined signal.

Optionally, the processor 21 is configured to: when the first combined signal or the second combined signal is obtained, keep the N received signals.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 13:
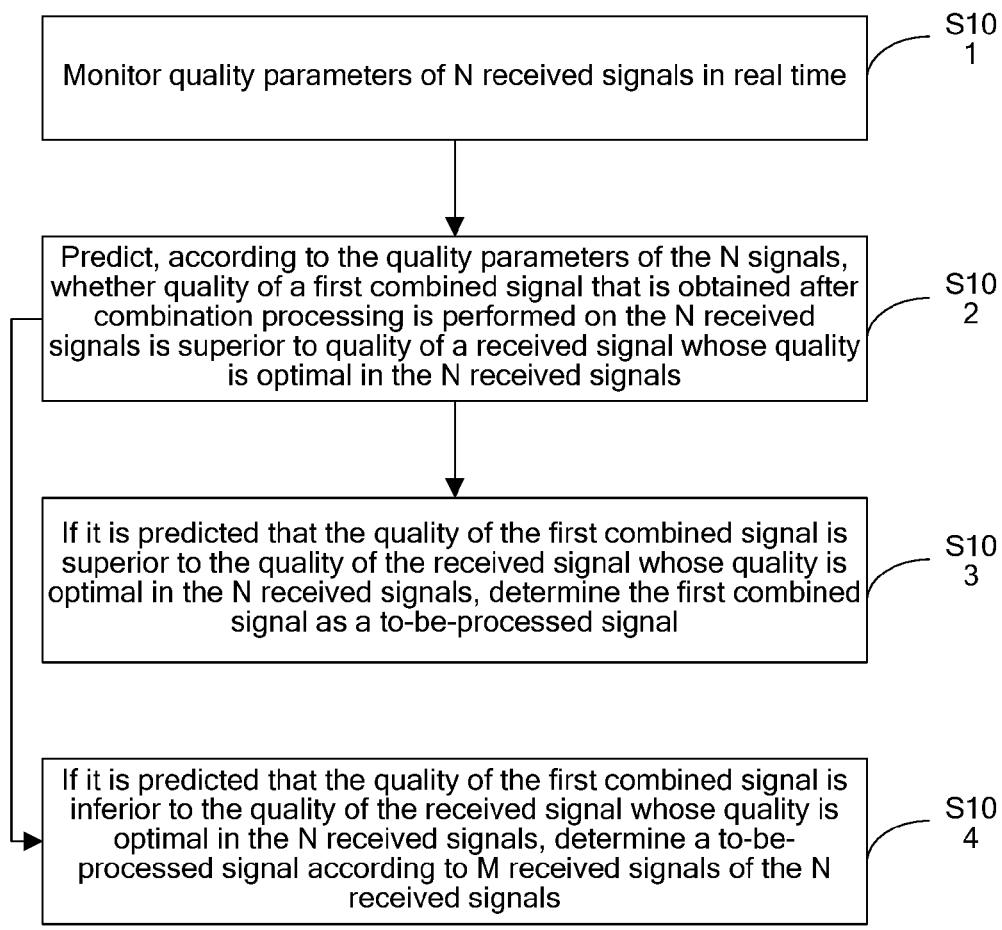
FIG. 13 is a schematic flowchart of a signal processing method according to Embodiment 1 of the present invention.

FIG. 13 is a schematic flowchart of a signal processing method according to Embodiment 1 of the present invention. As shown in FIG. 13, this embodiment is executed by the receiving device shown in any one of FIG. 2 to FIG. 12, and the receiving device performs the following steps.

S101: Monitor quality parameters of N received signals in real time.

The N received signals are obtained by N receive antennas by receiving a signal sent by a same transmit antenna of a sending device. Specifically, when using the N receive antennas to receive a signal sent by the sending device to obtain N received signals, the receiving device monitors quality parameters of the N received signals in real time.

N is an integer not less than 2. It may be understood that, to improve communication reliability during communication between the sending device and the receiving device, the receiving device uses the N receive antennas to receive a signal sent by a same transmit antenna of the sending device, to obtain N received signals. That is, the N received signals are generated by transmitting, through N different paths, a signal sent by one transmit antenna of the sending device. Subsequently, combination processing is performed on the N received signals, thereby increasing a reception gain.

However, because a communication environment is variable, N received signals that are generated by transmitting a same signal through different paths have performance differences, resulting in performance deterioration of a combined signal obtained after combination. Consequently, subsequent processing of the receiving device is affected. Therefore, as the N antennas continuously receive the signal sent by the sending device, quality parameters of the N received signals also need to be monitored in real time, to learn whether performance of a combined signal obtained after combination processing deteriorates.

S102: Predict, according to the quality parameters of the N received signals, whether quality of a first combined signal that is obtained after combination processing is performed on the N received signals is superior to quality of a received signal whose quality is optimal in the N received signals.

S103: If it is predicted that the quality of the first combined signal is superior to the quality of the received signal whose quality is optimal in the N received signals, determine the first combined signal as a to-be-processed signal.

If it is predicted, according to the quality parameters of the N received signals, the quality of the first combined signal that is obtained after combination processing is performed on the N received signals is superior to the quality of the received signal whose quality is optimal in the N received signals, a gain of the first combined signal is higher than any one of the N received signals, and subsequent processing continues to be performed by using the first combined signal.

S104: If it is predicted that the quality of the first combined signal is inferior to the quality of the received signal whose quality is optimal in the N received signals, determine a to-be-processed signal according to M received signals of the N received signals, where M is an integer greater than 0 and less than N.

Specifically, if it is predicted, according to the quality parameters of the N received signals, that the quality of the first combined signal that is obtained after combination processing is performed on the N received signals is inferior to the quality of the received signal whose quality is optimal in the N received signals, a gain of the first combined signal is not effectively increased, and communication quality that is obtained by performing subsequent signal processing by using the first combined signal is worse than communication quality that is obtained by performing subsequent signal processing by using the received signal whose quality is optimal in the N received signals. Therefore, in this embodiment, signal processing no longer continues to be performed according to the first combined signal, but a to-be-processed signal is determined again. For example, one of the N received signals is determined as the to-be-processed signal, or some of the N received signals are combined to obtain a combined signal whose quality does not deteriorate and reception gain is relatively high.

It should be noted that, receiving and sending of a signal are continuously performed. Therefore, the monitoring operation in S101 is performed in real time. Therefore, each time it is predicted, according to the quality parameters of the N received signals, that the quality of the first combined signal that is obtained after combination processing is performed on the N received signals does not deteriorate, subsequent signal processing may continue to be performed according to the first combined signal. When it is determined, according to the quality parameters of the N received signals, the quality of the first combined signal that is obtained after combination processing is performed on the N received signals deteriorates, signal processing no longer continues to be performed according to the first combined signal, thereby avoiding an adverse effect on a signal receiving procedure. Compared with selectively receiving one of the N received signals regardless whether a combined signal deteriorates in the prior art, in this embodiment, it is flexibly determined, in combination with quality parameters of current N received signals, whether the first combined signal deteriorates at a current moment. Therefore, when the first combined signal does not deteriorate, the first combined signal is selected as the to-be-processed signal, so that a relatively high reception gain generated by a combined signal with relatively desirable quality is not wasted, and the receiving device and a space diversity system in which the receiving device is located may work in a high modulation mode, thereby increasing a communication distance, increasing a communication capacity, and increasing efficiency of the space diversity system. In addition, when the first combined signal deteriorates, the first combined signal is flexibly filtered out, and signal processing no longer continues to be performed according to the first combined signal, thereby avoiding an adverse effect on a signal receiving procedure. It may be understood that, at a next moment after the first combined signal is filtered out, if it is predicted, by means of monitoring, that the quality of the first combined signal does not deteriorate at the next moment, and a state of being not deteriorated is kept for preset duration, the first combined signal is selected again, thereby achieving a relatively high reception gain of the first combined signal in time.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 14:
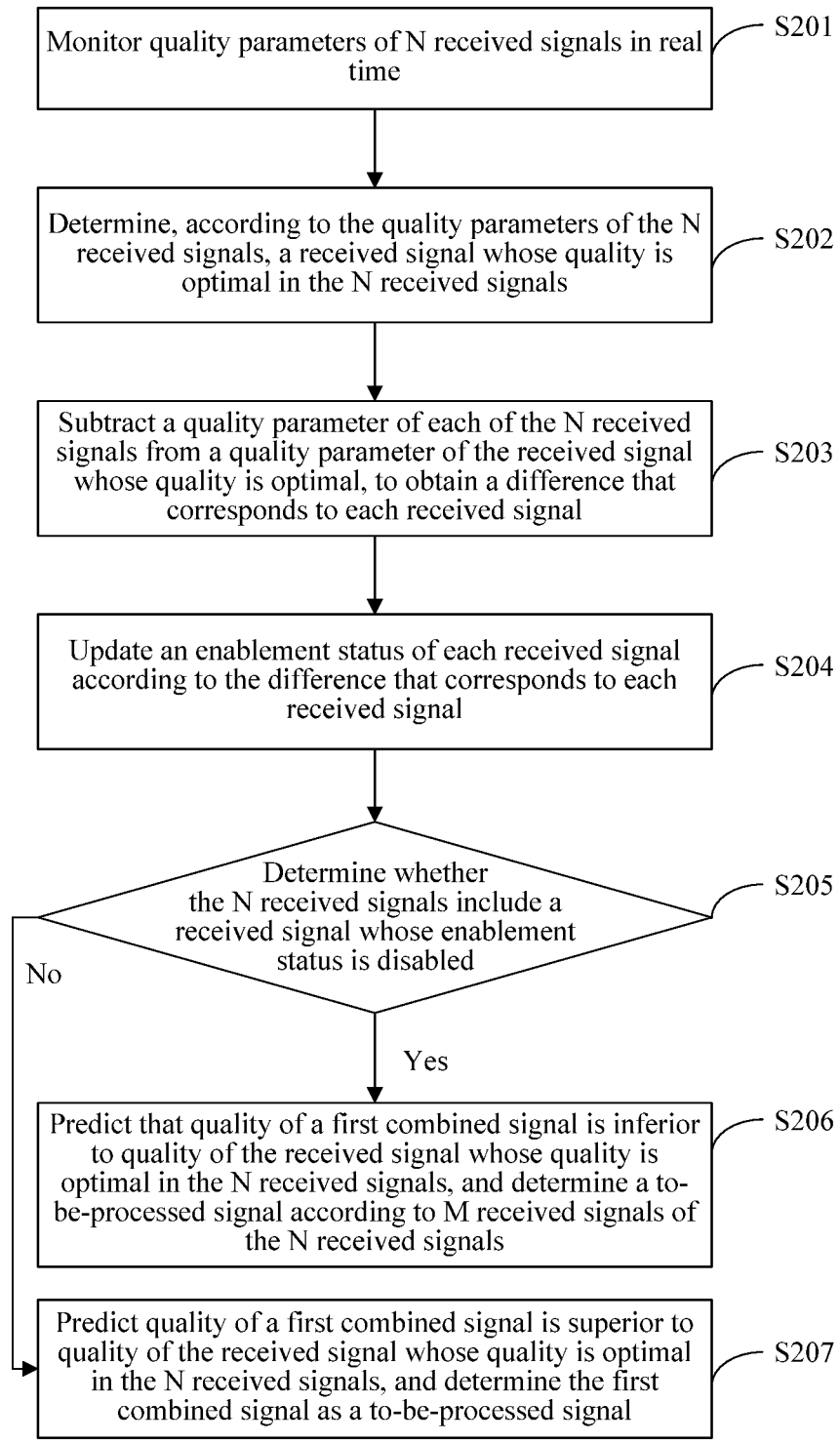
FIG. 14 is a schematic flowchart of a signal processing method according to Embodiment 2 of the present invention.

FIG. 14 is a schematic flowchart of a signal processing method according to Embodiment 2 of the present invention. As shown in FIG. 14, this embodiment is further described based on the embodiment shown in FIG. 13.

S201: Monitor quality parameters of N received signals in real time.

When the N received signals are continuously received, the receiving device also continuously monitors the received signals at the same time, and at least S202 to S204 below are performed in a monitoring process.

S202: Determine, according to the quality parameters of the N received signals, a received signal whose quality is optimal in the N received signals.

It may be understood that, quality of a signal may be measured by using, for example, a signal-to-noise ratio or a mean square error of the signal in a constellation diagram, and the signal-to-noise ratio, the mean square error, or the like each may be used as the quality parameter. Using the signal-to-noise ratio as an example, a received signal whose signal-to-noise ratio is the highest in the N received signals is used as the received signal whose quality is optimal in the N received signals.

S203: Subtract a quality parameter of each of the N received signals from a quality parameter of the received signal whose quality is optimal, to obtain a difference that corresponds to each received signal.

Quality of another received signal is determined based on the received signal whose quality is optimal. Specifically, whether quality of each received signal deteriorates is measured by using the difference between the quality parameter of the received signal whose quality is optimal and the quality parameter of each of the N received signals.

S204: Update an enablement status of each received signal according to the difference that corresponds to each received signal.

Optionally, using the signal-to-noise ratio as the quality parameter, if a difference that corresponds to one received signal exceeds a threshold, it may be considered that the received signal severely deteriorates compared with the received signal whose quality is optimal. If the received signal is used in combination, another received signal with relatively desirable quality is affected, and therefore, a reception gain of an obtained combined signal is not effectively increased and quality of the obtained combined signal deteriorates. Therefore, enablement status of a received signal has server quality deterioration may be set to disabled. If a difference that corresponds to one received signal does not exceed the threshold, it may be considered that, compared with the received signal whose quality is optimal, the received signal does not deteriorate or does not severely deteriorate. Therefore, if the received signal is used in combination, the gain of the obtained combined signal can be increased. Therefore, an enablement status of a received signal that does not deteriorate or not severely deteriorate may be set to enabled.

However, a communication environment is unstable, and if a same received signal has a low signal-to-noise ratio at a current moment but has an excessively high signal-to-noise ratio at a next moment, an enablement status of the received signal changes repeatedly between enabled and disabled. Consequently, a subsequent receiving procedure changes repeatedly and the receiving device is in an unstable working state. Therefore, optionally, two thresholds are used, that is, an upper threshold and a lower threshold are set in this embodiment. Specifically, an example in which the quality parameter is a signal-to-noise ratio is used in this embodiment, a process of updating the enablement status of the signal is specifically as follows.

If the enablement status of the received signal is enabled and the difference that corresponds to the received signal is greater than an upper threshold, the enablement status of the received signal is updated to disabled, if the enablement status of the received signal is enabled and the difference that corresponds to the received signal is not greater than an upper threshold, the enablement status of the received signal is kept enabled, if the enablement status of the received signal is disabled and the difference that corresponds to the received signal is less than a lower threshold, the enablement status of the received signal is updated to enabled, or if the enablement status of the received signal is disabled and the difference that corresponds to the received signal is not less than a lower threshold, the enablement status of the received signal is kept disabled.

By means of the upper threshold and the lower threshold, the enablement status of the received signal does not repeatedly change between enabled and disabled, which facilitates stability of a subsequent processing process.

S205: Determine whether the N received signals include a received signal whose enablement status is disabled; and if yes, perform S206; or if not, perform S207.

S206: Predict that quality of a first combined signal is inferior to quality of the received signal whose quality is optimal in the N received signals, and determine a to-be-processed signal according to M received signals of the N received signals.

S207: Predict quality of a first combined signal is superior to quality of the received signal whose quality is optimal in the N received signals, and determine the first combined signal as a to-be-processed signal.

Specifically, one of the N received signals that satisfies a preset condition is determined as the to-be-processed signal. The preset condition may be: A signal-to-noise ratio of the received signal is the highest in the N received signals or the received signal is in a bit-error-free state. Alternatively, combination processing is performed on all received signals that are in the N received signals and that do not cause the quality of the first combined signal to deteriorate, to obtain a second combined signal; and subsequently the second combined signal is determined as the to-be-processed signal.

According to this embodiment, it is determined, by monitoring N received signals, whether quality of a first combined signal obtained by combining the N received signals deteriorates, and it is determined, according to a determining result, whether to use the first combined signal as a to-be-processed signal for subsequent signal processing. That is, when the quality of the first combined signal deteriorates, the first combined signal no longer continues to be used, thereby avoiding affecting a communication activity. In addition, when the quality of the first combined signal does not deteriorate, the first combined signal is selected in time, and a relatively high reception gain generated by the first combined signal is fully used, thereby increasing efficiency of a space diversity system and improving communication performance.

Figure 15:
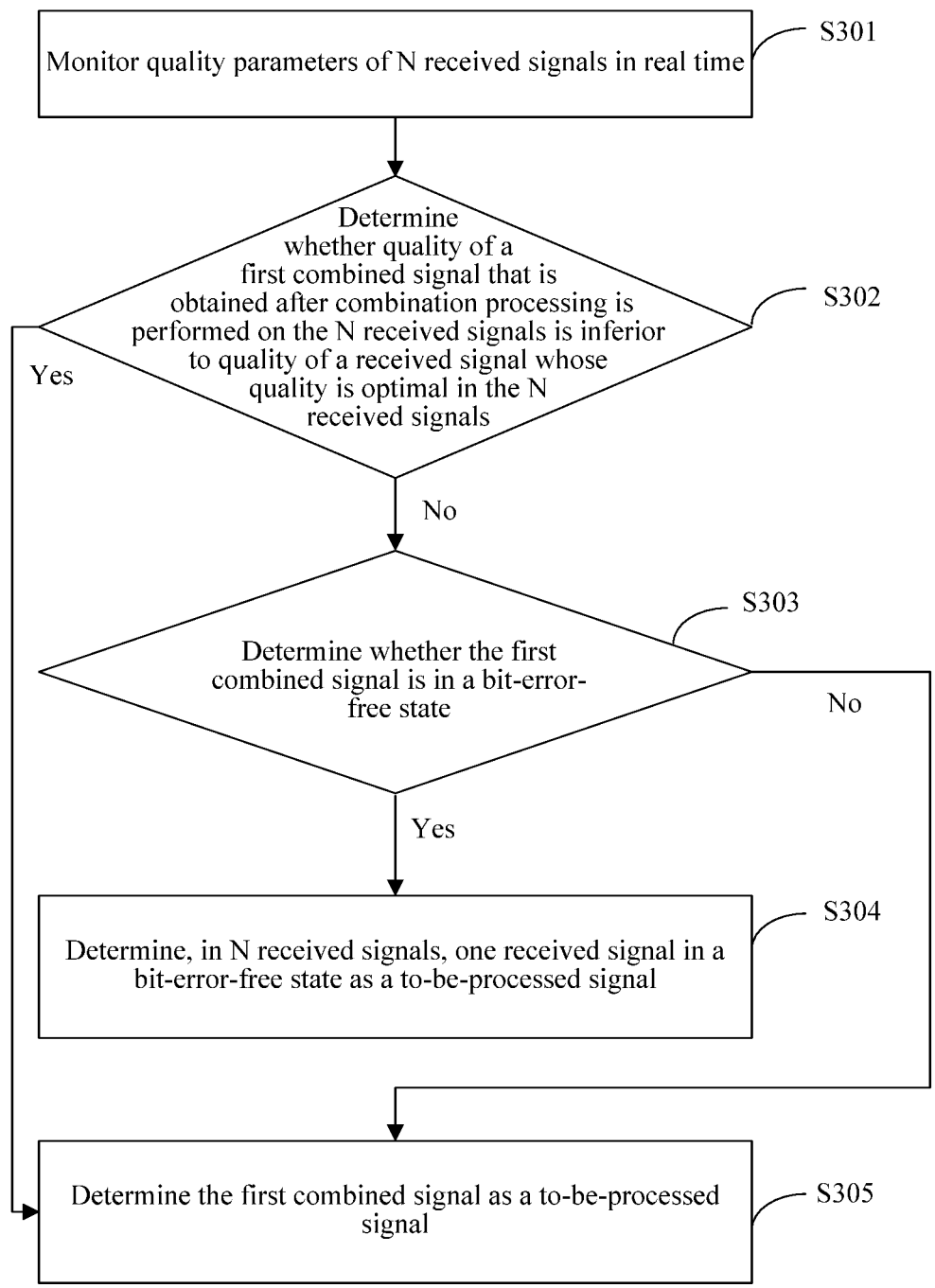
FIG. 15 is a schematic flowchart of a signal processing method according to Embodiment 3 of the present invention.

FIG. 15 is a schematic flowchart of a signal processing method according to Embodiment 3 of the present invention. As shown in FIG. 15, this embodiment is further described based on the embodiment shown in FIG. 13 or FIG. 14. This embodiment may specifically include the following steps with reference to the receiving devices shown in FIG. 2, FIG. 3, FIG. 5, and FIG. 6.

S301: Monitor quality parameters of N received signals in real time.

S302: Determine whether quality of a first combined signal that is obtained after combination processing is performed on the N received signals is inferior to quality of a received signal whose quality is optimal in the N received signals; and if yes, perform S305, or if not, perform S303.

When S302 is performed, optionally refer to S205 to S207. That is, it is determined whether the N received signals include a received signal whose enablement status is disabled; and if yes, it is determined that the quality of the first combined signal deteriorates, or if not, it is determined that the quality of the first combined signal does not deteriorate.

Specifically, using the receiving device shown in FIG. 5 as an example, a specific process of performing S302 is as follows: The optimization determining unit C3 determines a maximum value of signal-to-noise ratios of the N received signals output by the demodulation module A. The optimization determining unit C3 inputs the obtained maximum value into the difference calculation unit C1, and also inputs a signal-to-noise ratio of each received signal into the difference calculation unit C1. The difference calculation unit C1 updates an enablement status of each received signal according to a difference between the maximum value and the signal-to-noise ratio of each signal. After the updating is completed, it is predicted, according to the enablement status of each signal, whether the quality of the first combined signal is superior to the quality of the received signal whose quality is optimal in the N received signals.

When it is predicted that the quality of the first combined signal is superior to the quality of the received signal whose quality is optimal in the N received signals, the difference calculation unit C1 is further configured to notify the buffering and check unit R1 that the first combined signal that is output after the combination module H performs combination processing on the N received signals is a to-be-processed signal. Subsequently, the buffering and check unit R1 performs S303.

When it is predicted that the quality of the first combined signal is superior to the quality of the received signal whose quality is optimal in the N received signals, the difference calculation unit C1 is further configured to notify the buffering and check unit R1 that the first combined signal that is output after the combination module H performs combination processing on the N received signals is not the to-be-processed signal. Subsequently, the buffering and check unit R1 performs S306.

It should be noted that, when N is 2, that is, when the two received signals are Z1 and Z2 for example, the optimization determining unit C3 may be omitted. The difference calculation unit C1 may directly perform subtraction on quality parameters of the two received signals. If a difference between the quality parameters of the two received signals exceeds a preset value, it may be determined that quality of a first combined signal that is obtained after the two received signals are combined is inferior to quality of one of the two received signals. In this case, when the difference calculation unit C1 determines to input a control signal used to notify the buffering and check unit R1 of whether the quality of the first combined signal is inferior to quality of one of the two received signals, an enabled signal is used to represent that the quality of the first combined signal is not inferior to the quality of one of the two received signals, and a disabled signal is used to represent that the quality of the first combined signal is inferior to the quality of one of the two received signals. When it is specifically determined whether to output an enabled signal or a disabled signal, two preset values, that are, an upper preset value and a lower preset value, may also be set. Details are as follows:

If a current control signal is an enabled signal, and a difference between signal-to-noise ratios of Z1 and Z2 is greater than the upper preset value, the control signal is updated to a disabled signal, if a current control signal is an enabled signal, and a difference between signal-to-noise ratios of Z1 and Z2 is not greater than the upper preset value, the control signal is kept as the enabled signal, if a current control signal is a disabled signal, and a difference between signal-to-noise ratios of Z1 and Z2 is less than the lower preset value, the control signal is updated to an enabled signal, or if a current control signal is a disabled signal, and a difference between signal-to-noise ratios of Z1 and Z2 is not less than the lower preset value, the control signal is kept as the disabled signal.

S303: Determine whether the first combined signal is in a bit-error-free state; and if yes, perform S304, or if not, perform S305.

When this embodiment is applied to the field of microwave communication, a relatively high requirement is made for a received signal on which subsequent processing is performed, and the received signal is required to be currently in a bit-error-free state.

S304: Determine the first combined signal as a to-be-processed signal.

The combination module H continuously outputs the first combined signals; and the buffering and check unit R1 continuously buffers the first combined signal, checks the first combined signal, and outputs a check result to the determining unit R2 at the same time. Therefore, when it is determined that the first combined signal is in a bit-error-free state, the determining unit reads the first combined signal from the buffering and check unit R1 as the to-be-processed signal.

S305: Determine, in the N received signals, one received signal in a bit-error-free state as a to-be-processed signal.

The N receive antennas also continuously inputs the N received signals into the buffering and check unit R1; and the buffering and check unit R1 continuously buffers the N received signals, separately checks the N received signals, and outputs a check result to the determining unit R2. Therefore, the determining unit R2 reads a received signal in a bit-error-free state from the buffering and check unit R1 as the to-be-processed signal. Subsequently, the received signal is output to a subsequent processing module.

In addition, if the N received signals include multiple received signals in a bit-error-free state, one of the multiple received signals may be selected as the to-be-processed signal arbitrarily; or a received signal with a highest priority in the multiple received signals in a bit-error-free state is determined, where the priority may be determined according to a signal-to-noise ratio of the receive signal.

In addition, when the selective receiving module R obtains the first combined signal, the N received signals are kept at the same time. Therefore, once it is determined at a current moment that the quality of the first combined signal deteriorates or the first combined signal is in a bit-error state, one received signal in a bit-error-free state may be read from the N received signals as the to-be-processed signal, thereby implementing a seamless switch between the first combined signal and the N received signals. Subsequently, if it is found at a next moment that the quality of the first combined signal does not deteriorate or the first received signal is in a bit-error-free state, the first combined signal is read immediately, thereby avoiding wasting a relatively high reception gain generated by the combined signal.

According to this embodiment, it is determined, by monitoring N received signals, whether a first combined signal obtained by combining the N received signals deteriorates, so as to control whether to selectively receive the first combined signal for combination. That is, when the first combined signal deteriorates, a communication activity is not affected by the deteriorated first combined signal. In addition, when the quality of the first combined signal does not deteriorate, a relatively high reception gain generated by the first combined signal is achieved, thereby increasing efficiency of a space diversity system and improving communication performance.

Figure 16:
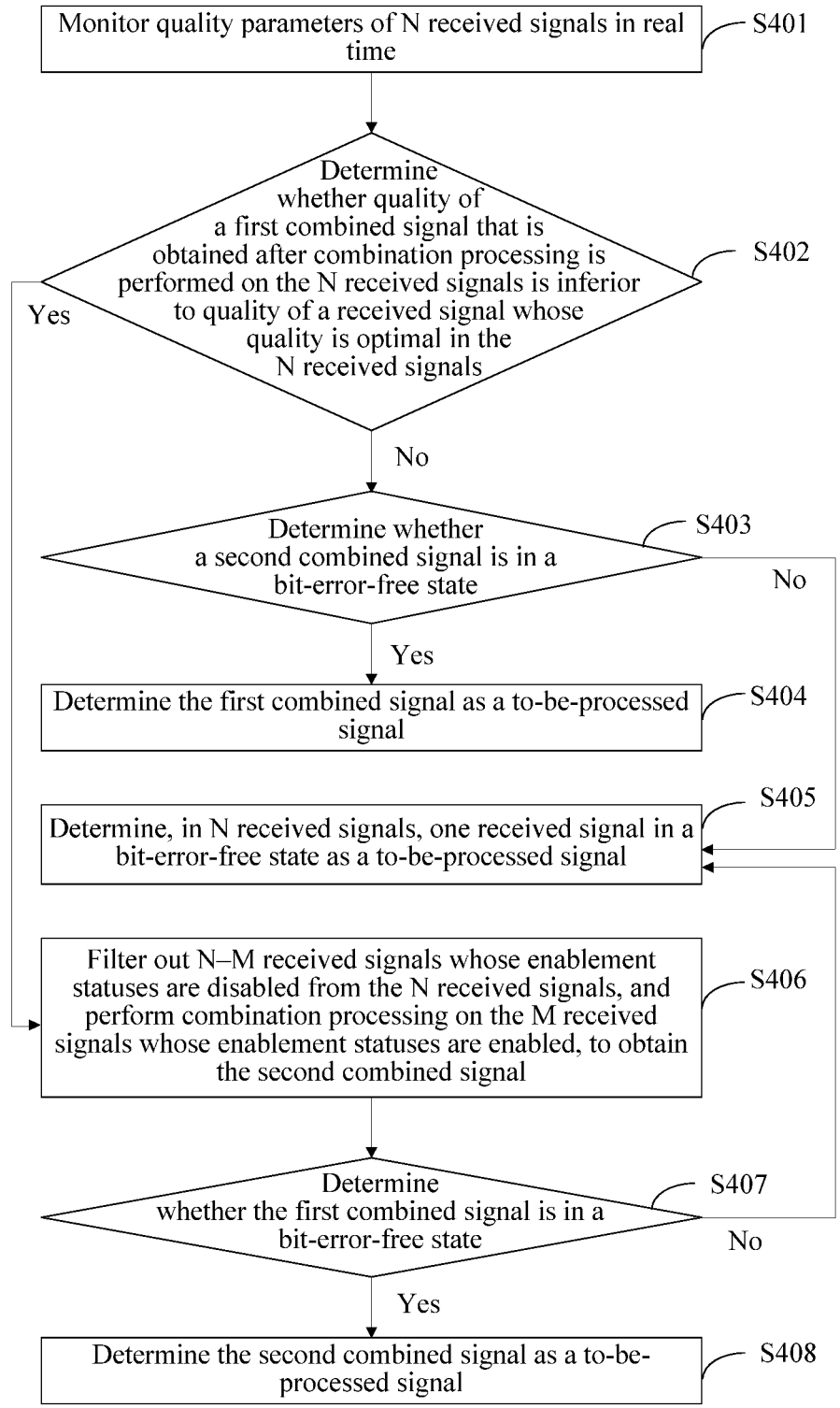
FIG. 16 is a schematic flowchart of a signal processing method according to Embodiment 4 of the present invention.

FIG. 16 is a schematic flowchart of a signal processing method according to Embodiment 4 of the present invention. As shown in FIG. 16, this embodiment is further described based on the embodiment shown in FIG. 13 or FIG. 14. This embodiment may specifically include the following steps with reference to the receiving devices shown in FIG. 2, FIG. 4, FIG. 8, and FIG. 9.

S401: Monitor quality parameters of N received signals in real time.

S402: Determine whether quality of a first combined signal that is obtained after combination processing is performed on the N received signals is inferior to quality of a received signal whose quality is optimal in the N received signals; and if not, perform S403, or if yes, perform S406.

When S402 is performed, refer to S205 and S206 for details. That is, it is determined whether the N received signals include a received signal whose enablement status is disabled; and if yes, it is determined that performance of the first combined signal deteriorates, or if not, it is determined that performance of the first combined signal does not deteriorate.

S403: Determine whether the first combined signal is in a bit-error-free state; and if yes, perform S404, or if not, perform S405.

S404: Determine the first combined signal as a to-be-processed signal.

Using the receiving device shown in FIG. 8 as an example, if it is predicted in S402 that the quality of the first combined signal that is obtained after combination processing is performed on the N received signals is the quality of the received signal whose quality is optimal in the N received signals, the combination module H continuously outputs the first combined signal; and the buffering and check unit R1 continuously buffers the first combined signal, checks the first combined signal, and outputs a check result to the determining unit R2 at the same time. Therefore, when it is determined that the first combined signal is in a bit-error-free state, the determining unit reads the first combined signal from the buffering and check unit R1 as the to-be-processed signal.

S405: Determine, in the N received signals, one received signal in a bit-error-free state as a to-be-processed signal.

The N receive antennas also continuously inputs the N received signals into the buffering and check unit R1; and the buffering and check unit R1 continuously buffers the N received signals, separately checks the N received signals, and outputs a check result to the determining unit R2. Therefore, the determining unit R2 reads a received signal in a bit-error-free state from the buffering and check unit R1 as the to-be-processed signal. Subsequently, the received signal is output to a subsequent processing module.

In addition, if the N received signals include multiple received signals in a bit-error-free state, one of the multiple received signals may be selected as the to-be-processed signal arbitrarily; or a received signal with a highest priority in the multiple received signals in a bit-error-free state is determined, where the priority may be determined according to a signal-to-noise ratio of the receive signal.

S406: Filter out N-M received signals whose enablement statuses are disabled from the N received signals, and perform combination processing on the M received signals whose enablement statuses are enabled, to obtain a second combined signal.

In this case, the combination module H outputs the second combined signal.

S407: Determine whether the second combined signal is in a bit-error-free state; and if yes, perform S408, or if not, perform S405.

The combination module H continuously outputs the second combined signals; and the buffering and check unit R1 continuously buffers the second combined signal, checks the second combined signal, and outputs a check result to the determining unit R2 at the same time. Therefore, when it is determined that the second combined signal is in a bit-error-free state, the determining unit reads the second combined signal from the buffering and check unit R1 as the to-be-processed signal. That is, S408 is performed.

S408: Determine the second combined signal as a to-be-processed signal.

In addition, when the selective receiving module R buffers the first combined signal or the second combined signal, the N received signals are kept at the same time. Therefore, once it is determined at a current moment that the quality of the first combined signal deteriorates or the first combined signal is in a bit-error state, or the second combined signal is in a bit-error state, one received signal in a bit-error-free state may be read from the N received signals as the to-be-processed signal, thereby implementing a seamless switch between the first combined signal or the second combined signal and the N received signals. Subsequently, if it is found at a next moment that the quality of the first combined signal does not deteriorate or the first received signal is in a bit-error-free state, or the second received signal is in a bit-error-free state, the first combined signal or the second received signal is read immediately, thereby avoiding wasting a relatively high reception gain generated by the combined signal.

According to this embodiment, it is determined, by monitoring N received signals, whether a first combined signal obtained by combining the N received signals deteriorates, so as to control whether to selectively receive the first combined signal for combination. That is, when the first combined signal deteriorates, a communication activity is not affected by the deteriorated first combined signal. In addition, when the quality of the first combined signal does not deteriorate, a relatively high reception gain generated by the first combined signal is achieved, thereby increasing efficiency of a space diversity system and improving communication performance.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A receiving device, comprising:
   N receive antennas;
   a combinator;
   a demodulator;
   a processor; and
   a non-transitory computer-readable storage medium storing a program to be executed by the processor;
   wherein the N receive antennas are in communication connection to the combinator, the demodulator, and the processor, and the combinator is in communication connection to the processor;
   wherein the demodulator is configured to demodulate N received signals to obtain quality parameters of the N received signals, and send the quality parameters of the N received signals to the processor, wherein the N received signals are obtained by the N receive antennas by receiving a signal sent by a same transmit antenna of a sending device;
   wherein the program including instructions to:
   monitor the quality parameters of the N received signals in real time;
   predict, according to the quality parameters of the N received signals, whether quality of a first combined signal that is output after the combinator performs combination processing on the N received signals is superior to quality of a received signal whose quality is optimal in the N received signals;
   determine, in response to predicting that the quality of the first combined signal is superior to the quality of the received signal whose quality is optimal in the N received signals, the first combined signal, which is output as a to-be-processed signal after the combinator performs combination processing on the N received signals; and
   determine, in response to predicting that the quality of the first combined signal is inferior to the quality of the received signal whose quality is optimal in the N received signals, a to-be-processed signal according to M received signals of the N received signals, wherein N is an integer not less than 2 and M is an integer greater than 0 and less than N.

2. The receiving device according to claim 1, further comprising a selective receiver, wherein the selective receiver is in communication connection to the combinator, and is further in communication connection to the N receive antennas;
   wherein the instructions to determine the to-be-processed signal according to the M received signals of the N received signals includes instructions to perform at least one of:
   notify the selective receiver that the first combined signal that is output after the combinator performs combination processing on the N received signals is not the to-be-processed signal, and trigger the selective receiver to determine, in the N received signals, one received signal that satisfies a preset condition as the to-be-processed signal; or
   control, according to combination indication information, the combinator to perform combination processing on all received signals that are in the N received signals and that do not cause the quality of the first combined signal to be inferior to the quality of the received signal whose quality is optimal in the N received signals, and output a second combined signal to the selective receiver.

3. The receiving device according to claim 2, wherein the selective receiver is configured to, after the processor determines the first combined signal, which is output after the combinator performs combination processing on the N received signals, as the to-be-processed signal, check the first combined signal output by the combinator; and
   wherein the selective receiver is further configured to determine the first combined signal as the to-be-processed signal when the selective receiver determines that the first combined signal is in a bit-error-free state.

4. The receiving device according to claim 2, wherein the selective receiver is configured to:
   receive the second combined signal output by the combinator, and check the second combined signal; and
   determine the first combined signal as the to-be-processed signal when the selective receiver determines that the second combined signal is in a bit-error-free state.

5. The receiving device according to claim 4, wherein the selective receiver is further configured to determine, in the N received signals, in response to the selective receiver determining that the first combined signal is in a bit-error state or determines that the second combined signal is in a bit-error state, any received signal in a bit-error-free state as the to-be-processed signal if the selective receiver determines that the received signal is in a bit-error-free state.

6. The receiving device according to claim 2, wherein the selective receiver is configured to:
   check the received signals sent by the N receive antennas; and
   determine, in the N received signals, one received signal in a bit-error-free state as the to-be-processed signal.

7. The receiving device according to claim 2, wherein the instructions to monitor the quality parameters of the N received signals in real time comprises:
   determine, according to the quality parameters of the N received signals obtained by the demodulator, the received signal whose quality is optimal in the N received signals;
   subtract a quality parameter of each of the N received signals from a quality parameter of the received signal whose quality is optimal, to obtain a difference that corresponds to each received signal; and
   update an enablement status of each received signal according to the difference that corresponds to each received signal.

8. The receiving device according to claim 7, wherein the quality parameter is a signal-to-noise ratio; and
   wherein the instructions to update an enablement status of each received signal according to the difference that corresponds to each received signal include instructions to perform one of:
      update the enablement status of the received signal to disabled in response to the enablement status of the received signal being enabled and the difference that corresponds to the received signal being greater than an upper threshold;
      keep the enablement status of the received signal enabled in response to the enablement status of the received signal being enabled and the difference that corresponds to the received signal being not greater than an upper threshold;
      update the enablement status of the received signal to enabled in response to the enablement status of the received signal being disabled and the difference that corresponds to the received signal being less than a lower threshold; or
      keep the enablement status of the received signal disabled in response to the enablement status of the received signal being disabled and the difference that corresponds to the received signal being not less than a lower threshold.

9. The receiving device according to claim 8, wherein the instructions to predict whether quality of a first combined signal that is output after combination processing is performed on the N received signals is superior to quality of a received signal whose quality is optimal in the N received signals includes instructions to:
   determine whether the N received signals comprise a received signal whose enablement status is disabled;
   determine that the quality of the first combined signal is inferior to the quality of the received signal whose quality is optimal in the N received signals in response to the N received signals comprising a received signal whose enablement status is disabled; and
   determine that the quality of the first combined signal is superior to the quality of the received signal whose quality is optimal in the N received signals in response to the N received signals not comprising a received signal whose enablement status is disabled.

10. The receiving device according to claim 2, wherein the combination indication information indicates the enablement statuses of the N received signals; and
    wherein the instructions to control the combinator to perform combination processing on all received signals that are in the N received signals and that do not cause the quality of the first combined signal to be inferior to the quality of the received signal whose quality is optimal in the N received signals, and output a second combined signal to the selective receiver include instructions to:
       set weighting coefficients of N-M received signals whose enablement statuses are disabled in the N received signals to 0; and
       determine weighting coefficients for the M received signals whose enablement statuses are enabled, so that the combinator performs combination processing on the M received signals whose enablement statuses are enabled and outputs the second combined signal.

11. A received signal processing method, comprising:
    monitoring quality parameters of N received signals in real time, wherein the N received signals are obtained by N receive antennas by receiving a signal sent by a same transmit antenna of a sending device;
    predicting, according to the quality parameters of the N received signals, whether quality of a first combined signal that is obtained after combination processing is performed on the N received signals is superior to quality of a received signal whose quality is optimal in the N received signals;
    determining the first combined signal as a to-be-processed signal in response to predicting that the quality of the first combined signal is superior to the quality of the received signal whose quality is optimal in the N received signals; and
    determining a to-be-processed signal according to M received signals of the N received signals in response to predicting that the quality of the first combined signal is inferior to the quality of the received signal whose quality is optimal in the N received signals;
    wherein N is an integer not less than 2 and M is an integer greater than 0 and less than N.

12. The processing method according to claim 11, wherein the determining a to-be-processed signal according to M received signals of the N received signals comprises performing at least one of:
    determining, in the N received signals, one received signal that satisfies a preset condition as the to-be-processed signal; or
    performing combination processing on all received signals that are in the N received signals and that do not cause the quality of the first combined signal to be inferior to the quality of the signal whose quality is optimal in the N received signals, to obtain a second combined signal; and determining the second combined signal as the to-be-processed signal.

13. The processing method according to claim 12, further comprising:
    determining that the first combined signal is in a bit-error-free state before the determining the first combined signal as a to-be-processed signal.

14. The processing method according to claim 13, further comprising:
    determining, in the N received signals, in response to determining that the first combined signal is in a bit-error state or in response to determining that the second combined signal is in a bit-error state any received signal in a bit-error-free state as the to-be-processed signal.

15. The processing method according to claim 12, further comprising:
   determining that the second combined signal is in a bit-error-free state before the determining the second combined signal as the to-be-processed signal.

16. The processing method according to claim 12, wherein the determining one received signal that satisfies a preset condition as the to-be-processed signal comprises:
   determining, in the N received signals, one received signal in a bit-error-free state as the to-be-processed signal.

17. The processing method according to claim 12, wherein the monitoring quality parameters of N received signals in real time comprises:
   determining, according to the quality parameters of the N received signals, the received signal whose quality is optimal in the N received signals;
   subtracting a quality parameter of each of the N received signals from a quality parameter of the received signal whose quality is optimal, to obtain a difference that corresponds to each received signal; and
   updating an enablement status of each received signal according to the difference that corresponds to each received signal.

18. The processing method according to claim 17, wherein the quality parameter is a signal-to-noise ratio, and
   wherein the updating an enablement status comprises:
      updating the enablement status of the received signal to disabled in response to the enablement status of the received signal being enabled and the difference that corresponds to the received signal being greater than an upper threshold;
      keeping the enablement status of the received signal enabled in response to the enablement status of the received signal being enabled and the difference that corresponds to the received signal being not greater than an upper threshold;
      updating the enablement status of the received signal to enabled, in response to the enablement status of the received signal being disabled and the difference that corresponds to the received signal being less than a lower threshold; or
      keeping the enablement status of the received signal disabled in response to the enablement status of the received signal being disabled and the difference that corresponds to the received signal being not less than a lower threshold.

19. The processing method according to claim 18, wherein the predicting, according to the quality parameters of the N received signals, whether quality of a first combined signal that is obtained after combination processing is performed on the N received signals is superior to quality of a received signal whose quality is optimal in the N received signals comprises:
   determining whether the N received signals comprise a received signal whose enablement status is disabled; and
   performing one of:
      predicting that the quality of the first combined signal is inferior to the quality of the received signal whose quality is optimal in the N received signals in response to the N received signals comprising a received signal whose enablement status is disabled; or
      predicting that the quality of the first combined signal is superior to the quality of the received signal whose quality is optimal in the N received signals in response to the N received signals not comprising a received signal whose enablement status is disabled.

20. The processing method according to claim 19, wherein the performing combination processing on all received signals that are in the N received signals and that do not cause the quality of the first combined signal to be inferior to the quality of the signal whose quality is optimal in the N received signals, to obtain a second combined signal comprises:
   filtering out N-M received signals whose enablement statuses are disabled from the N received signals; and
   performing combination processing on the M received signals whose enablement statuses are enabled, to obtain the second combined signal.

* * * * *